United States Patent
Leen et al.

(10) Patent No.: US 9,002,481 B2
(45) Date of Patent: Apr. 7, 2015

(54) BUILDING CONTROLLERS WITH LOCAL AND GLOBAL PARAMETERS

(75) Inventors: Cary Leen, Hammond, WI (US); Patrick Tessier, Maple Grove, MN (US); Stan Zywicki, Eden Praire, MN (US)

(73) Assignee: Honeywell International Inc., Morristown, NJ (US)

( * ) Notice: Subject to any disclaimer, the term of this patent is extended or adjusted under 35 U.S.C. 154(b) by 1103 days.

(21) Appl. No.: 12/836,407

(22) Filed: Jul. 14, 2010

(65) Prior Publication Data
US 2012/0012662 A1 Jan. 19, 2012

(51) Int. Cl.
*G05B 15/02* (2006.01)
*F24F 11/00* (2006.01)

(52) U.S. Cl.
CPC ......... *F24F 11/0012* (2013.01); *F24F 11/0015* (2013.01); *G05B 15/02* (2013.01); *F24F 2011/0013* (2013.01); *F24F 2011/0068* (2013.01)

(58) Field of Classification Search
CPC ......... G05B 15/00; G05B 15/02; F24F 11/00; H04L 12/2803
See application file for complete search history.

(56) References Cited

U.S. PATENT DOCUMENTS

| | | | |
|---|---|---|---|
| 4,079,366 A | 3/1978 | Wong | |
| 4,174,807 A | 11/1979 | Smith et al. | |
| 4,206,872 A | 6/1980 | Levine | |
| 4,224,615 A | 9/1980 | Penz | |
| 4,264,034 A | 4/1981 | Hyltin et al. | |
| 4,296,334 A | 10/1981 | Wong et al. | |
| 4,298,946 A | 11/1981 | Hartsell et al. | |
| 4,308,991 A | 1/1982 | Peinetti et al. | |
| 4,332,352 A | 6/1982 | Jaeger | |
| 4,336,902 A | 6/1982 | Neal | |
| 4,337,822 A | 7/1982 | Hyltin et al. | |
| 4,337,893 A | 7/1982 | Flanders et al. | |
| 4,373,664 A | 2/1983 | Barker et al. | |
| 4,379,483 A | 4/1983 | Farley | |
| 4,382,544 A | 5/1983 | Stewart | |
| 4,386,649 A | 6/1983 | Hines et al. | |

(Continued)

FOREIGN PATENT DOCUMENTS

| | | |
|---|---|---|
| DE | 3334117 | 4/1985 |
| EP | 0070414 | 1/1983 |

(Continued)

OTHER PUBLICATIONS

"CorAccess Systems/In Home," http://web.archive.org/web20011212084427/www.coraccess.com/home.html, 1 page, copyright 2001, printed Aug. 19, 2004.

(Continued)

*Primary Examiner* — Sean Shechtman
(74) *Attorney, Agent, or Firm* — Seager Tufte & Wickhem LLC.

(57) ABSTRACT

A building controller is configured to designate one or more stored parameters as local or global. Parameters that are designated as global may be selectively communicated to remote devices and, parameters that are designated as local, may remain local to the building controller. In some instances, the remote devices may be selectable by a user, include all the other devices on the network, and/or include devices that share a common wireless accessory (e.g. an outdoor temperature sensor).

20 Claims, 14 Drawing Sheets

(56) References Cited

U.S. PATENT DOCUMENTS

| | | |
|---|---|---|
| 4,388,692 A | 6/1983 | Jones et al. |
| 4,431,134 A | 2/1984 | Hendricks et al. |
| 4,433,719 A | 2/1984 | Cherry et al. |
| 4,442,972 A | 4/1984 | Sahay et al. |
| 4,446,913 A | 5/1984 | Krocker |
| 4,479,604 A | 10/1984 | Didner |
| 4,503,471 A | 3/1985 | Hanajima et al. |
| 4,506,827 A | 3/1985 | Jamieson et al. |
| 4,556,169 A | 12/1985 | Zervos |
| 4,585,164 A | 4/1986 | Butkovich et al. |
| 4,606,401 A | 8/1986 | Levine et al. |
| 4,621,336 A | 11/1986 | Brown |
| 4,622,544 A | 11/1986 | Bially et al. |
| 4,628,201 A | 12/1986 | Schmitt |
| 4,646,964 A | 3/1987 | Parker et al. |
| 4,717,333 A | 1/1988 | Carignan |
| 4,725,001 A | 2/1988 | Carney et al. |
| 4,837,731 A | 6/1989 | Levine et al. |
| 4,881,686 A | 11/1989 | Mehta |
| 4,918,439 A | 4/1990 | Wozniak et al. |
| 4,948,040 A | 8/1990 | Kobayashi et al. |
| 4,969,508 A | 11/1990 | Tate et al. |
| 4,992,779 A | 2/1991 | Sugino et al. |
| 4,997,029 A | 3/1991 | Otsuka et al. |
| 5,005,365 A | 4/1991 | Lynch |
| 5,012,973 A | 5/1991 | Dick et al. |
| 5,038,851 A | 8/1991 | Metha |
| 5,053,752 A | 10/1991 | Epstein et al. |
| 5,065,813 A | 11/1991 | Berkeley et al. |
| 5,086,385 A | 2/1992 | Launey et al. |
| 5,088,645 A | 2/1992 | Bell |
| 5,140,310 A | 8/1992 | DeLuca et al. |
| 5,161,606 A | 11/1992 | Berkeley et al. |
| 5,170,935 A | 12/1992 | Federspiel et al. |
| 5,172,565 A | 12/1992 | Wruck et al. |
| 5,181,653 A | 1/1993 | Foster et al. |
| 5,187,797 A | 2/1993 | Nielsen et al. |
| 5,230,482 A | 7/1993 | Ratz et al. |
| 5,238,184 A | 8/1993 | Adams |
| 5,251,813 A | 10/1993 | Kniepkamp |
| 5,259,445 A | 11/1993 | Pratt et al. |
| 5,272,477 A | 12/1993 | Tashima et al. |
| 5,329,991 A | 7/1994 | Metha et al. |
| 5,348,078 A | 9/1994 | Dushane et al. |
| 5,386,577 A | 1/1995 | Zenda |
| 5,404,934 A | 4/1995 | Carlson et al. |
| 5,414,618 A | 5/1995 | Mock et al. |
| 5,482,209 A | 1/1996 | Cochran et al. |
| 5,495,887 A | 3/1996 | Kathnelson et al. |
| 5,526,422 A | 6/1996 | Keen |
| 5,537,106 A | 7/1996 | Mitcuhashi |
| 5,566,879 A | 10/1996 | Longtin |
| 5,570,837 A | 11/1996 | Brown et al. |
| 5,590,831 A | 1/1997 | Manson et al. |
| 5,603,451 A | 2/1997 | Helander et al. |
| 5,654,813 A | 8/1997 | Whitworth |
| 5,673,850 A | 10/1997 | Uptegraph |
| 5,682,206 A | 10/1997 | Wehmeyer et al. |
| 5,732,691 A | 3/1998 | Maiello et al. |
| 5,782,296 A | 7/1998 | Metha |
| 5,818,428 A | 10/1998 | Eisenbrandt et al. |
| 5,833,134 A | 11/1998 | Ho et al. |
| 5,839,654 A | 11/1998 | Weber |
| 5,873,519 A | 2/1999 | Beilfuss |
| 5,886,697 A | 3/1999 | Naughton et al. |
| 5,902,183 A | 5/1999 | D'Souza |
| 5,915,473 A | 6/1999 | Ganesh et al. |
| D413,328 S | 8/1999 | Kazama |
| 5,937,942 A | 8/1999 | Bias et al. |
| 5,947,372 A | 9/1999 | Tiernan |
| 5,950,709 A | 9/1999 | Krueger et al. |
| 6,009,355 A | 12/1999 | Obradovich et al. |
| 6,020,881 A | 2/2000 | Naughton et al. |
| 6,032,867 A | 3/2000 | Dushane et al. |
| D422,594 S | 4/2000 | Henderson et al. |
| 6,059,195 A | 5/2000 | Adams et al. |
| 6,081,197 A | 6/2000 | Garrick et al. |
| 6,101,824 A | 8/2000 | Meyer et al. |
| 6,104,963 A | 8/2000 | Cebasek et al. |
| 6,112,246 A | 8/2000 | Horbal et al. |
| 6,119,125 A | 9/2000 | Gloudeman et al. |
| 6,121,875 A | 9/2000 | Hamm et al. |
| 6,140,987 A | 10/2000 | Stein et al. |
| 6,141,595 A | 10/2000 | Gloudeman et al. |
| 6,149,065 A | 11/2000 | White et al. |
| 6,152,375 A | 11/2000 | Robison |
| 6,154,681 A | 11/2000 | Drees et al. |
| 6,167,316 A | 12/2000 | Gloudeman et al. |
| 6,192,282 B1 | 2/2001 | Smith et al. |
| 6,196,467 B1 | 3/2001 | Dushane et al. |
| 6,208,331 B1 | 3/2001 | Singh et al. |
| 6,216,956 B1 | 4/2001 | Ehlers et al. |
| 6,236,326 B1 | 5/2001 | Murphy |
| 6,260,765 B1 | 7/2001 | Natale et al. |
| 6,285,912 B1 | 9/2001 | Ellison et al. |
| 6,290,140 B1 | 9/2001 | Pesko et al. |
| D448,757 S | 10/2001 | Okubo |
| 6,315,211 B1 | 11/2001 | Sartain et al. |
| 6,318,639 B1 | 11/2001 | Toth |
| 6,330,806 B1 | 12/2001 | Beaverson et al. |
| 6,344,861 B1 | 2/2002 | Naughton et al. |
| 6,351,693 B1 | 2/2002 | Monie et al. |
| 6,394,359 B1 | 5/2002 | Morgan |
| 6,398,118 B1 | 6/2002 | Rosen et al. |
| 6,453,687 B2 | 9/2002 | Sharood et al. |
| D464,948 S | 10/2002 | Vasquez et al. |
| 6,460,774 B2 | 10/2002 | Sumida et al. |
| 6,466,132 B1 | 10/2002 | Caronna et al. |
| 6,478,233 B1 | 11/2002 | Shah |
| 6,502,758 B2 | 1/2003 | Cottrell |
| 6,518,953 B1 | 2/2003 | Armstrong |
| 6,518,957 B1 | 2/2003 | Lehtinen et al. |
| 6,546,419 B1 | 4/2003 | Humpleman et al. |
| 6,556,899 B1 | 4/2003 | Harvey et al. |
| 6,578,770 B1 | 6/2003 | Rosen |
| 6,580,950 B1 | 6/2003 | Johnson et al. |
| 6,581,846 B1 | 6/2003 | Rosen |
| 6,595,430 B1 | 7/2003 | Shah |
| D478,051 S | 8/2003 | Sagawa |
| 6,608,560 B2 | 8/2003 | Abrams |
| 6,619,555 B2 | 9/2003 | Rosen |
| 6,621,507 B1 | 9/2003 | Shah |
| 6,667,690 B2 | 12/2003 | Durej et al. |
| 6,726,112 B1 | 4/2004 | Ho |
| D492,282 S | 6/2004 | Lachello et al. |
| 6,786,421 B2 | 9/2004 | Rosen |
| 6,789,739 B2 | 9/2004 | Rosen |
| 6,810,307 B1 | 10/2004 | Addy |
| 6,810,397 B1 | 10/2004 | Qian et al. |
| 6,834,298 B1 | 12/2004 | Singer et al. |
| 6,834,303 B1 | 12/2004 | Garg et al. |
| 6,868,293 B1 | 3/2005 | Schurr et al. |
| D512,208 S | 12/2005 | Kubo et al. |
| D520,989 S | 5/2006 | Miller |
| 7,039,391 B2 | 5/2006 | Rezvani et al. |
| 7,050,026 B1 | 5/2006 | Rosen |
| 7,055,759 B2 | 6/2006 | Wacker et al. |
| 7,083,109 B2 | 8/2006 | Pouchak |
| 7,089,088 B2 | 8/2006 | Terry et al. |
| 7,108,194 B1 | 9/2006 | Hankins, II |
| 7,130,720 B2 | 10/2006 | Fisher |
| D531,588 S | 11/2006 | Peh |
| D533,515 S | 12/2006 | Klein et al. |
| 7,146,253 B2 | 12/2006 | Hoog et al. |
| 7,152,806 B1 | 12/2006 | Rosen |
| 7,156,318 B1 | 1/2007 | Rosen |
| 7,163,156 B2 | 1/2007 | Kates |
| D542,236 S | 5/2007 | Klein et al. |
| 7,222,800 B2 | 5/2007 | Wruck |
| 7,225,054 B2 | 5/2007 | Amundson et al. |
| 7,232,075 B1 | 6/2007 | Rosen |
| 7,249,718 B2 | 7/2007 | Beitelmal et al. |
| D548,703 S | 8/2007 | Vendramini |
| D549,667 S | 8/2007 | Huang |

(56) References Cited

U.S. PATENT DOCUMENTS

| | | |
|---|---|---|
| 7,266,777 B2 | 9/2007 | Scott et al. |
| 7,354,005 B2 | 4/2008 | Carey et al. |
| 7,370,364 B2 | 5/2008 | Dobbins et al. |
| 7,469,550 B2 | 12/2008 | Chapman, Jr. et al. |
| 7,587,475 B2 | 9/2009 | Koneru |
| 7,756,917 B2 | 7/2010 | DeHart et al. |
| 7,765,826 B2 | 8/2010 | Nichols |
| 2001/0029585 A1 | 10/2001 | Simon et al. |
| 2001/0042684 A1 | 11/2001 | Essalik et al. |
| 2001/0052459 A1 | 12/2001 | Essalik et al. |
| 2002/0005435 A1 | 1/2002 | Cottrell |
| 2002/0011923 A1 | 1/2002 | Cunningham et al. |
| 2002/0022991 A1 | 2/2002 | Sharood et al. |
| 2002/0060701 A1 | 5/2002 | Naughton et al. |
| 2002/0092779 A1 | 7/2002 | Essalik et al. |
| 2002/0096572 A1 | 7/2002 | Chene et al. |
| 2002/0138184 A1 | 9/2002 | Kipersztok et al. |
| 2002/0173929 A1 | 11/2002 | Seigel |
| 2003/0000692 A1 | 1/2003 | Okano et al. |
| 2003/0014179 A1 | 1/2003 | Szukala et al. |
| 2003/0033156 A1 | 2/2003 | McCall |
| 2003/0033230 A1 | 2/2003 | McCall |
| 2003/0034897 A1 | 2/2003 | Shamoon et al. |
| 2003/0034898 A1 | 2/2003 | Shamoon et al. |
| 2003/0069650 A1* | 4/2003 | Karmiy et al. ............... 700/7 |
| 2003/0074489 A1 | 4/2003 | Steger et al. |
| 2003/0103075 A1 | 6/2003 | Rosselot |
| 2003/0121652 A1 | 7/2003 | Carey et al. |
| 2003/0123224 A1 | 7/2003 | LaCroix et al. |
| 2003/0136135 A1 | 7/2003 | Kim et al. |
| 2003/0142121 A1 | 7/2003 | Rosen |
| 2003/0150926 A1 | 8/2003 | Rosen |
| 2003/0150927 A1 | 8/2003 | Rosen |
| 2003/0177012 A1 | 9/2003 | Drennen |
| 2004/0074978 A1 | 4/2004 | Rosen |
| 2004/0193324 A1 | 9/2004 | Hoog et al. |
| 2004/0245352 A1 | 12/2004 | Smith |
| 2004/0262410 A1 | 12/2004 | Hull |
| 2004/0267385 A1* | 12/2004 | Lingemann ............... 700/83 |
| 2005/0083168 A1 | 4/2005 | Breitenbach |
| 2005/0182498 A1* | 8/2005 | Landou et al. ............ 700/20 |
| 2005/0270151 A1 | 12/2005 | Winick |
| 2006/0150244 A1* | 7/2006 | Klein et al. ............... 726/12 |
| 2007/0114293 A1 | 5/2007 | Gugenheim |
| 2007/0114295 A1 | 5/2007 | Jenkins |
| 2009/0100155 A1 | 4/2009 | Lee |
| 2009/0140064 A1 | 6/2009 | Schultz et al. |
| 2010/0049335 A1 | 2/2010 | Assarsson et al. |
| 2010/0070643 A1* | 3/2010 | Puranik et al. ............ 709/231 |
| 2010/0128691 A1* | 5/2010 | McFarland ............... 370/329 |

FOREIGN PATENT DOCUMENTS

| | | |
|---|---|---|
| EP | 0678204 | 3/2000 |
| EP | 0985994 | 3/2000 |
| EP | 1033641 | 9/2000 |
| EP | 1074009 | 7/2001 |
| FR | 2711230 | 4/1995 |
| WO | WO 97/11448 | 3/1997 |
| WO | WO 97/39392 | 10/1997 |
| WO | WO 00/43870 | 7/2000 |
| WO | WO 01/52515 | 7/2001 |
| WO | WO 01/79952 | 10/2001 |

OTHER PUBLICATIONS

"HAI Company Background," http://www.homeauto.com/AboutHAI/abouthai_main.htm, 2 pages, printed Aug. 19, 2004.

"High-tech options take hold in new homes—200-08-28—Dallas Business Journal," http://bizjournals.com/dallas/stories/2000/08/28/focus4, 3 pages, dated Aug. 28, 2000, printed Aug. 19, 2004.

"Home Toys Review—TouchLinc", http://www.hometoys.com/htinews/aug99/reviews/touchlinc/touchlinc.htm, 3 pages, dated Aug. 1999, printed Aug. 20, 2004.

"HTI News Release," http://www.hometoys.com/htinews/apr99/releases/hal01.htm, 3 pages, Apr. 1999.

"Mark of Excellence Award Finalist Announced," http://64.233.167.104/search?Q=cache:ciOA2YtYaBIJ:www.hometoys.com/releases/mar. . ., 6 pages, Leopard Touchscreen on p. 2, dated prior to Mar. 4, 2000, printed Aug. 20, 2004.

"Product Review—Philips Pronto Remote Control," http://hometheaterhifi.com/volume_6_2/philipsprontoremotecontrol.html, 5 pages, dated May 1999, printed Aug. 20, 2004.

"RC X10 Automation Forum: Control your Heating and Cooling System with Pronto(1/1)," http://www.remotecentral.com/cgi-bin/mboard/rc-x10/thread.cgi?12, 2 pages, dated Apr. 23, 1999, printed Aug. 20, 2004.

"Spotlight on integrated systems," Custom Builder, V8, N2, p. 66(6), Mar.-Apr. 1993.

"Vantage Expands Controls for Audio/Video, HVAC and Security," http://www.hometoys.com/htinews/aug99/releases/vantage03.htm, 2 pages, dated Aug. 3, 1999, printed Aug. 20, 2004.

ADI, "Leopard User Manual," 93 pages, 2001.

Adicon 2500, "The Automator," 4 pages, Oct.-Dec. 2000.

ADT Security Services, "iCenter Advanced User Interface 8142ADT," Installation and Setup Guide, 4 pages, May 2001; First Sale Feb. 2001.

AED Electronics, Inc., "Presenting Climatouch the Most Innovative Thermostat in the World!," 2 pages, prior to Nov. 30, 2007.

Aprilaire Electronic Thermostats Models 8344, 8346, 8348, 8363, 8365, 8366 Operating Instructions, 8 pages, 2003.

Aube Technologies, Electronic Thermostat for Heating System Model TH135-01, 5 pages, Aug. 14, 2001.

Aube Technologies, TH140-28 Electronic Programmable Thermostat, Installation Instructions and User Guide, pp. 1-4, Jan. 22, 2004.

AutomatedBuildings.com Article—"Thin Client" Solutions, "Pressure, Air Flow, Temperature, Humidity & Valves," Dwyer Instruments, Inc., 5 pages, printed Sep. 20, 2004.

Blake et al., "Seng 310 Final Project Demo Program" Illustration, 3 pages, Apr. 6, 2001.

Blake et al., "Seng 310 Final Project" Report, dated Apr. 6, 2001.

Blister Pack Insert from a Ritetemp 8082 Touch Screen Thermostat Product, 2 pages, 2002.

Braeburn Model 3000 Owner's Manual, pp. 1-13, 2001.

Braeburn Model 5000 Owners Manual, pp. 1-17, 2001.

BRK Electronics Maximum Protection Plus Ultimate Convenience Smoke Alarm, 24 pages, Sep. 2000.

BRK First Alert, User's Manual, Smoke and Fire Alarms, pp. 1-7, Nov. 2002.

Business Wire, "MicroTouch Specialty Products Group to Capitalize on Growing Market for Low-Cost Digital Matrix Touchscreens," p1174 (2 pages), Jan. 6, 1999.

Cardio Manual, available at http://www.secant.ca/En/Documentation/Cardio2é-Manual.pdf, Cardio Home Automation Inc., 55 pages, printed Sep. 28, 2004.

Cardio, by Secant; http://www.hometoys.com/htinews/apr98/reviews/cardio.htm, "HTINews Review," Feb. 1998, 5 pages, printed Sep. 14, 2004.

Carrier Microelectronic Programmable Thermostat Owner's Manual, pp. 1-24, May 1994.

Carrier TSTATCCRF01 Programmable Digital Thermostat, pp. 1-21, prior to Apr. 21, 2005.

Carrier, "Edge Performance Programmable Owner's Manual," 64 pages, 2007.

Carrier, "Programmable Dual Fuel Thermostat," Installation, Start-Up & Operating Instructions, pp. 1-12, Oct. 1998.

Carrier, "Programmable Thermostats," Installation, Start-Up & Operating Instructions, pp. 1-16, Sep. 1998.

Carrier, "Standard Programmable Thermostat," Homeowner's Manual, pp. 1-8 pages, 1998.

Carrier, "Thermidistat Control," Installation, Start-Up, and Operating Instructions, pp. 1-12, Aug. 1999.

Climatouch, User Manual, Climatouch CT03TSB Thermostat, Climatouch CT03TSHB Thermostat with Humidity Control, Outdoor UHR Temperature Transmitter 217S31, 19 pages, Printed Sep. 15, 2004.

CorAccess, "Companion 6," User Guide, pp. 1-20, Jun. 17, 2002.

(56) References Cited

OTHER PUBLICATIONS

Danfoss RT51/51RF & RT52/52RF User Instructions, 2 pages, Jun. 2004.
DeKoven et al., "Designing Collaboration in Consumer Products," 2 pages, 2001.
DeKoven et al., "Measuring Task Models in Designing Intelligent Products," 2 pages, Jan. 13-16, 2002.
DESA Heating Products, "Wireless Hand-Held Remote Control Sets Models (C) GHRCB and (C)GHRCTB, Operating Instructions," 4 pages, May 2003.
Domotique Secant Home Automation—Web Page, available at http://www.secant.ca/En/Company/Default.asp, 1 page, printed Sep. 28, 2004.
Firex Smoke Alarm, Ionization Models AD, ADC Photoelectric Model Pad, 4 pages, prior to Apr. 21, 2005.
Freudenthal et al., "Communicating extensive smart home functionality to users of all ages: the design of a mixed-initiative multimodal thermostat-interface," pp. 34-39, Mar. 12-13, 2001.
Gentex Corporation, HD135, 135° Fixed Temperature Heat Detector AC Pwered, 120V, 60Hz With Battery Backup, Installation Instructions—Owner's Information, pp. 1-5, Jun. 1, 1998.
Gentex Corporation, 9000 Series, Photoelectric Type Single Station/Multi-Station Smoke Alarms AC Powered With Battery Backup, Installation Instructions—Owner's Information, pp. 9-1 to 9-6, Jan. 1, 1993.
Honeywell Brivis Deluxe Programmable Thermostat, pp. 1-20, 2002.
Honeywell Brivis T8602C Chronotherm IV Deluxe Programmable Thermostats, Installation Instructions, pp. 1-12, 2002.
Honeywell CT8602C Professional Fuel Saver Thermostat, pp. 1-6, 1995.
Honeywell Electronic Programmable Thermostat, Owner's Guide, pp. 1-20, 2003.
Honeywell Electronic Programmable Thermostats, Installation Instructions, pp. 1-8, 2003.
Honeywell News Release, "Honeywell's New Sysnet Facilities Integration System for Boiler Plant and Combustion Safety Processes," 4 pages, Dec. 15, 1995.
Honeywell T8002 Programmable Thermostat, Installation Instructions, pp. 1-8, 2002.
Honeywell T8602A,B,C,D and TS8602A,C Chronotherm III Fuel Saver Thermostats, Installation Instructions, pp. 1-12, 1995.
Honeywell T8602D Chronotherm IV Deluxe Programmable Thermostats, Installation Instructions, pp. 112, 2002.
Honeywell TH8000 Series Programmable Thermostats, Owner's Guide, pp. 1-44, 2004.
Honeywell, "Introduction of the 57350A Honeywell WebPAD Information Appliance," Home and Building Control Bulletin, 2 pages, Aug. 29, 2000; Picture of WebPad Device with touch screen, 1 Page; and screen shots of WebPad Device, 4 pages.
Honeywell, "W7006A Home Controller Gateway User Guide," 31 pages, Jul. 2001.
Honeywell, MagicStat® CT3200 Programmable Thermostat, Installation and Programming Instructions, pp. 1-24, 2001.
http://webarchive.org/web20061019145123/www.bapihvac.com . . . , "BAPI Wireless Analog Output Modules," 2 pages, Copyright 2006.
http://www.bapihvac.com/Wireless_Output_Modules.htm, "Wireless Analog Output Modules," 2 pages, Copyright 2007.
http://www.cc.gatech.edu/computing/classes/cs6751_94_fall/groupc/climate-2/node1.html, "Contents," 53 pages, printed Sep. 20, 2004.
http://www.ritetemp.info/rtMenu_13.html, Rite Temp 8082, 8 pages , printed Jun. 20, 2003.
http://www.thermostatsales.com, Robertshaw, "9610 Digital Programmable Thermostat," 3 pages, printed Jun. 17, 2004.
http://www.thermostatsales.com, Robertshaw, "9700 Deluxe Programmable Thermostat" 3 pages, printed Jun. 17, 2004.
http://www.thermostatsales.com, Robertshaw, "9710 Deluxe Programmable Thermostat," 3 pages, printed Jun. 17, 2004.
http://www.thermostatsales.com, Robertshaw, "9720 Deluxe Programmable Thermostat," 3 pages, printed Jun. 17, 2004.
Hunter, "44200/44250," Owner's Manual, 32 pages, prior to Jul. 7, 2004.
Hunter, "44300/44350," Owner's Manual, 35 pages, prior to Jul. 7, 2004.
Hunter, "Auto Saver 550", Owner's Manual Model 44550, 44 pages, prior to Jul. 7, 2004.
Install Guide for Ritetemp Thermostat 8082, 6 pages, 2002.
Invensys™, "9700i 9701i 9715i 9720i Deluxe Programmable Thermostats," User's Manual, pp. 1-28, prior to Jul. 7, 2004.
Logitech, "Harmony 880 Remote User Manual," v. 1, pp. 1-15, prior to Nov. 30, 2007.
Lux ELV1 Programmable Line Voltage Thermostat, Installation Instructions, 3 pages, prior to Jul. 7, 2004.
Lux Products Corporation, "9000RF Remote Instructions," 2 pages, prior to Nov. 30, 2007.
Lux TX500 Series Smart Temp Electronic Thermostat, 3 pages, prior to Jul. 7, 2004.
Lux TX9000 Installation, 3 pages, prior to Apr. 21, 2005.
Lux, "511 Series Smart Temp Electronic Thermostat," Owner's Manual, 3 pages, prior to Jul. 7, 2004.
Lux, "600 Series Smart Temp Electronic Thermostat," Owner's Manual, 3 pages, prior to Jul. 7, 2004.
Lux, "602 Series Multi-Stage Programmable Thermostat," Owner's Manual, 2 pages, prior to Jul. 7, 2004.
Lux, "605/2110 Series Programmable Heat Pump Thermostat," Owner's Manual, 3 pages, prior to Jul. 7, 2004.
Lux, "700/9000 Series Smart Temp Electronic Thermostat," Owner's Manual, 3 pages, prior to Jul. 7, 2004.
Lux, "PSPH521 Series Programmable Heat Pump Thermostat," Owner's Manual, 3 pages, prior to Jul. 7, 2004.
Lux, "TX1500 Series Smart Temp Electronic Thermostat," Owner's Manual, 6 pages, prior to Jul. 7, 2004.
Metasys, "HVAC PRO for Windows User's Manual," 308 pages, 1998.
Mounting Template for Ritetemp Thermostat 8082, 1 page, 2002.
OMRON Electronic Components, LLC, "Micro Tilt Sensor D6B," Cat. No. B02WAD1, 2 pages, Jun. 2002.
OMRON Electronic Components, LLC, "Micro Tilt Sensor D6B," Cat. No. JB301-E3-01, 6 pages, Mar. 2005.
Operation Manual for Ritetemp Touch Screen Thermostat 8082, 8 pages, 2002.
Proliphix, "Web Enabled IP Thermostats, Intelligent HVAC Control," Proliphix Inc., 2 pages, on or before Aug. 28, 2004.
Proliphix, "Web Enabled IP Thermostats, Ultimate in Energy Efficiency!," Proliphix Inc., 2 pages, on or before Aug. 28, 2004.
Proliphix, Inc., "NT10e & NT20e," 54 pages, on or before Aug. 30, 2005.
Quick Start Guide for Ritetemp Thermostat 8082, 1 page, 2002.
Remote Control Power Requirement for Ritetemp Thermostat 8082, 1 page, 2002.
Ritetemp Operation 8029, 3 pages, Jun. 19, 2002.
Ritetemp Operation 8050, 5 pages, Jun. 26, 2002.
Ritetemp Operation 8085, pp. 1-6, prior to Apr. 21, 2005.
Sealed Unit Parts Co., Inc., Supco & CTC Thermostats . . . loaded with features, designed for value!, 6 pages, prior to Apr. 21, 2005.
Sharp Corporation, "GP1S036HEZ Phototransistor Output, Transmissive Photointerrupter with Tilt Direction (4-Direction) Detecting," pp. 1-11, Oct. 3, 2005.
Totaline Model P474-1035 Owner's Manual Programmable 5-2 Day Digital Thermostat, pp. 1-21, Apr. 2003.
Totaline Star CPE230RF, Commercial Programmable Thermostat Wireless Transmitter, Owner's Manual, pp. 1-16, Oct. 1998.
Totaline Star P/N P474-0130 Non-Programmable Digital Thermostat Owner's Manual, pp. 1-22, prior to Apr. 21, 2005.
Totaline, "1 For All programmable Digital Thermostat," Owner's Manual P/N P374-1100FM, 23 pages, Nov. 1998.
Totaline, "1 For All Programmable Digital Thermostat," Owner's Manual P/N P474-1050, 21 pages, Nov. 1998.
Totaline, "1 For All Programmable Digital Thermostat," Owner's Manual P/N P374-1100, 24 pages, Apr. 2001.
Totaline, "Intellistat Combination Temperature and Humidity Control," Owner's Manual P/N P374-1600, 25 pages, Jun. 2001.

(56) References Cited

OTHER PUBLICATIONS

Totaline, "P/N 374-0431 Thermostat Remote Control & Receiver," 11 pages, prior to Nov. 30, 2007.
Totaline, "Programmable Thermostat Configurable for Advanced Heat Pump or Dual Fuel Operation," Owner's Manual P/N P374-1500, 24 pages, Jun. 1999.
Totaline, "Submittal for: P474-1100RF, P474-1100REC Wireless Thermostat," 1 page, prior to Nov. 30, 2007.
Totaline, "Wireless Remote Sensor, Model P474-0401-1RF/REC," 2 pages, prior to Nov. 30, 2007.
Totaline, "Instructions P/N P474-1010", Manual, 2 pages, Dec. 1998.
Totaline, "Programmable Thermostat", Homeowner's Guide, 27 pages, Dec. 1998.
Totaline, "Wireless Programmable Digital Thermostat," Owner's Manual 474-1100RF, 21 pages, 2000.
Trane, "Wireless Zone Sensor. Where Will Technology Take You?", 4 pages, Feb. 2006.
Trane, "High Performance Buildings," 12 pages, prior to Jul. 14, 2010.
Trane, "Installation, Operation and Maintenance, Wireless Sensors Models WTS, WZS, and WDS," 52 pages, Apr. 2008.
Trane, "Marketing Guide, Wireless Sensors Models WTS and WZS," 18 pages, Jan. 2007.
Trane, "Product Catalog, Wireless Sensors Models WTS and WZS," 8 pages, Mar. 2008.
Travis Industries, Remote Fireplace Thermostat, Part #99300651, 6 pages, printed Feb. 3, 2003.
Trouble Shooting Guide for Ritetemp Thermostat 8082, 1 page, 2002.
Visor Handheld User Guide, 280 pages, Copyright 1999-2000.
Warmly Yours, "Model TH111GFCI-P (120 VAC)," Manual, pp. 1-4, prior to Jul. 7, 2004.
White-Rodgers 1F80-224 Programmable Electronic Digital Thermostat, Installation and Operation Instructions, 8 pages, prior to Apr. 21, 2005.
White-Rodgers Comfort-Set III Thermostat, pp. 1-44, prior to Jul. 7, 2004.
White-Rodgers Installation Instructions for Heating & Air Conditioning IF78 Non-Programmable Thermostat, 6 pages, prior to Apr. 21, 2005.
White-Rodgers Installation Instructions for Heating & Air Conditioning IF78 5/2 Day Programmable Thermostat, 7 pages, prior to Jul. 7, 2004.
White-Rodgers, "Installation Instructions for Heating & Air Conditioning IF72 5/2 Day Programmable Heat Pump Thermostat," 8 pages, prior to Jul. 7, 2004.
White-Rodgers, "Comfort-Set 90 Series Thermostat," Manual, pp. 1-24, prior to Jul. 7, 2004.
White-Rodgers, 1F80-240 "(for Heating Only systems) Programmable Electronic Digital Thermostat," Installation and Operation Instructions, 8 pages, prior to Jul. 7, 2004.
White-Rodgers, 1F80-241 "Programmable Electronic Digital Thermostat," Installation and Operation Instructions, 6 pages, prior to Jul. 7, 2004.
White-Rodgers, 1F80-261 "Programmable Electronic Digital Thermostat," Installation and Operation Instructions, 8 pages, prior to Jul. 7, 2004.
White-Rodgers, 1F81-261 "Programmable Electronic Digital Multi-Stage Thermostat," Installation and Operation Instructions, 8 pages, prior to Jul. 7, 2004.
White-Rodgers, 1F82-261 "Programmable Electronic Digital Heat Pump Thermostat," Installation and Operation Instructions, 8 pages, prior to Jul. 7, 2004.
White-Rodgers, Comfort-Set 90 Series Premium, 4 pages, prior to Apr. 21, 2005.
www.icmcontrols.com, Simplecomfort, SC3000 Single Stage Heat/Single Stage Cool or Single Stage Heat Pump/Manual Changeover, 1 page, prior to Jul. 7, 2004.
www.icmcontrols.com, Simplecomfort, SC3001 Single Stage Heat/Single Stage Cool or Single Stage Heat Pump/Manual Changeover, 1 page, prior to Jul. 7, 2004.
www.icmcontrols.com, Simplecomfort, SC3006 Single Stage Heat/Single Stage Cool or Single Stage Heat Pump/Manual Changeover, 1 page, prior to Jul. 7, 2004.
www.icmcontrols.com, Simplecomfort, SC3201 2 Stage Heat Pump Manual Changeover, 1 page, prior to Jul. 7, 2004.
www.icmcontrols.com, Simplecomfort, SC3801 2 Stage Heat/2 Stage Cool 2 Stage Heat Pump/Audio Changeover, 1 page, prior to Jul. 7, 2004.

\* cited by examiner

BUILDING CONTROLLERS WITH LOCAL AND GLOBAL PARAMETERS

FIELD

The present disclosure relates generally to building control systems, and more particularly, to selectively communicating parameters and/or settings across devices in building control systems.

BACKGROUND

Heating, ventilation, and/or air conditioning (HVAC) systems are often used to control the comfort level within a building or other structure. Many HVAC systems include an HVAC controller or other device that activates and deactivates one or more HVAC components of the HVAC system to affect and control one or more environmental conditions within the building. These environmental conditions can include, but are not limited to, temperature, humidity, and/or ventilation. In many cases, the HVAC controller may include, or have access to, one or more sensors, and may use parameters provided by the one or more sensors to help control the one or more HVAC components to achieve desired programmed or set environmental conditions.

Many HVAC controllers have a user interface that can be used to program or otherwise operate the HVAC controller. By interacting with the user interface, the user may, for example, change a set point, program a schedule, enable or disable certain HVAC components, and/or perform some other action or task. In some cases, such as in some zoned HVAC system, more than one HVAC controller may be used to control an HVAC system. In some instances, each of the HVAC controllers may be programmed with different set points, schedules, etc.

Due to the complexity of modern HVAC systems, installation and/or programming of the HVAC controllers, sensors and/or other devices in the system can be time consuming and tedious, which in some cases, can increase the likelihood of programming errors during installation. There is a need, therefore, for improved systems and devices that can help reduce installation and/or programming time, as well as reduce programming errors.

SUMMARY

The present disclosure relates generally to building control systems, and more particularly, to selectively communicating parameters and/or settings across devices in building control systems. In one illustrative embodiment, a building controller may include a wireless interface, a memory, a user interface, and a control module in communication with the wireless interface, the memory, and the user interface. The control module may be configured to store a plurality of parameters in the memory and to selectively transmit one or more of the plurality of parameters to a remote device via the wireless interface, wherein each of the plurality of parameters are configured to be designated as one of a local parameter or a global parameter, and the control module is configured to transmit only the global parameters to the remote device.

In another illustrative embodiment, a method of configuring a plurality of devices on a building control system network. The method may include providing a building control system network including a plurality of devices, wherein the plurality of devices are configured to wirelessly communicate over a building control system network, each of the plurality of devices including a memory configured to store a number of parameters. The method may further include storing a first parameter in a first memory of a first device of the plurality of devices and designating the first parameter stored in the first memory as a global parameter or a local parameter. If the first parameter is designated as a global parameter, the method includes transmitting the first parameter from the first device to a second device and storing the first parameter in a second memory of the second device. If the first parameter is designated as a local parameter, the method includes not transmitting the first parameter from the first device to the second device.

The preceding summary is provided to facilitate an understanding of some of the innovative features unique to the present disclosure and is not intended to be a full description. A full appreciation of the disclosure can be gained by taking the entire specification, claims, drawings, and abstract as a whole.

BRIEF DESCRIPTION

The invention may be more completely understood in consideration of the following detailed description of various illustrative embodiments of the disclosure in connection with the accompanying drawings, in which.

Figure 2:
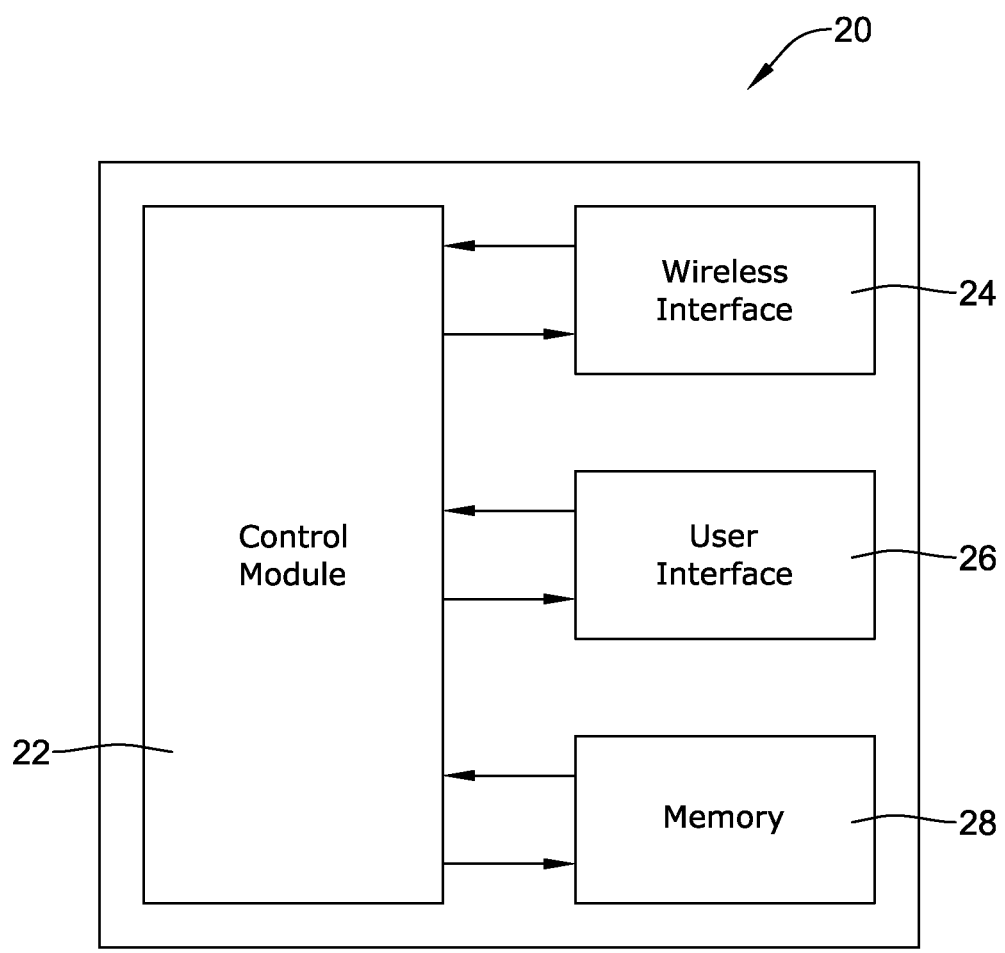
FIG. 2 is a block diagram of an illustrative building controller that may be used in conjunction with the HVAC system of FIG. 1.
Figure 3:
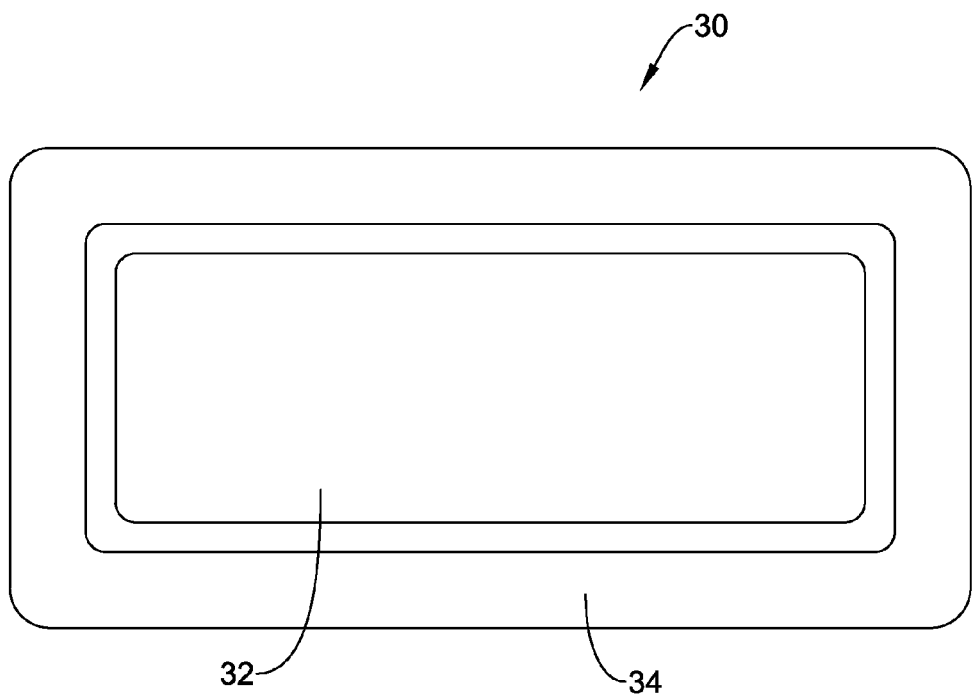
FIG. 3 is a front perspective view of an illustrative HVAC controller.
Figure 4:
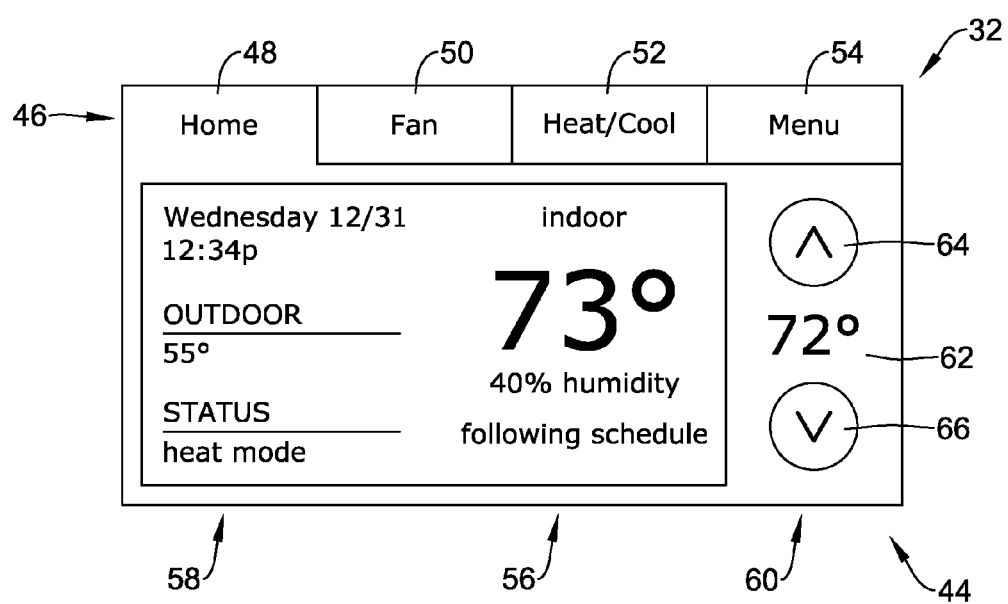
Figure 5:
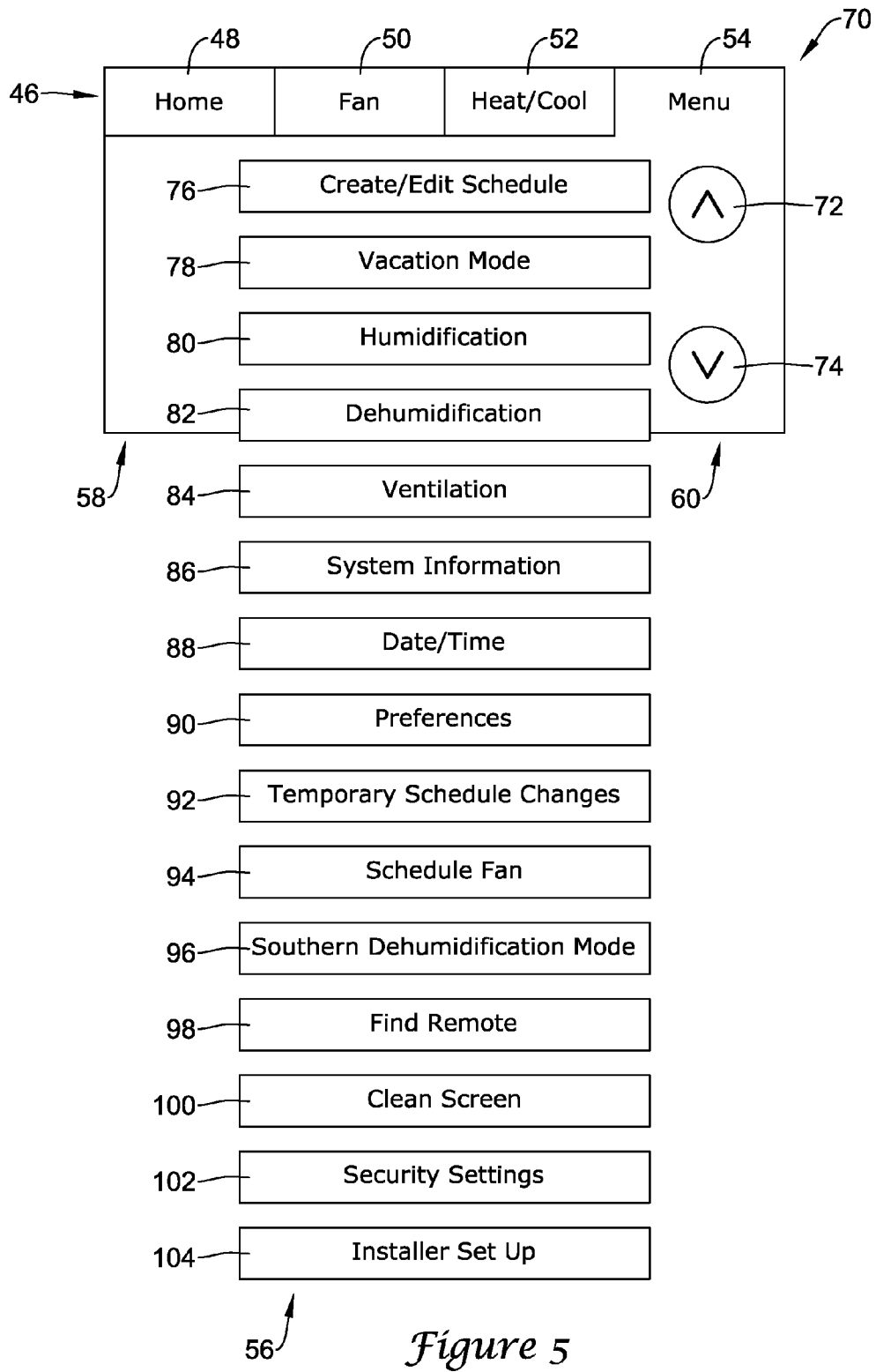
Figure 18:
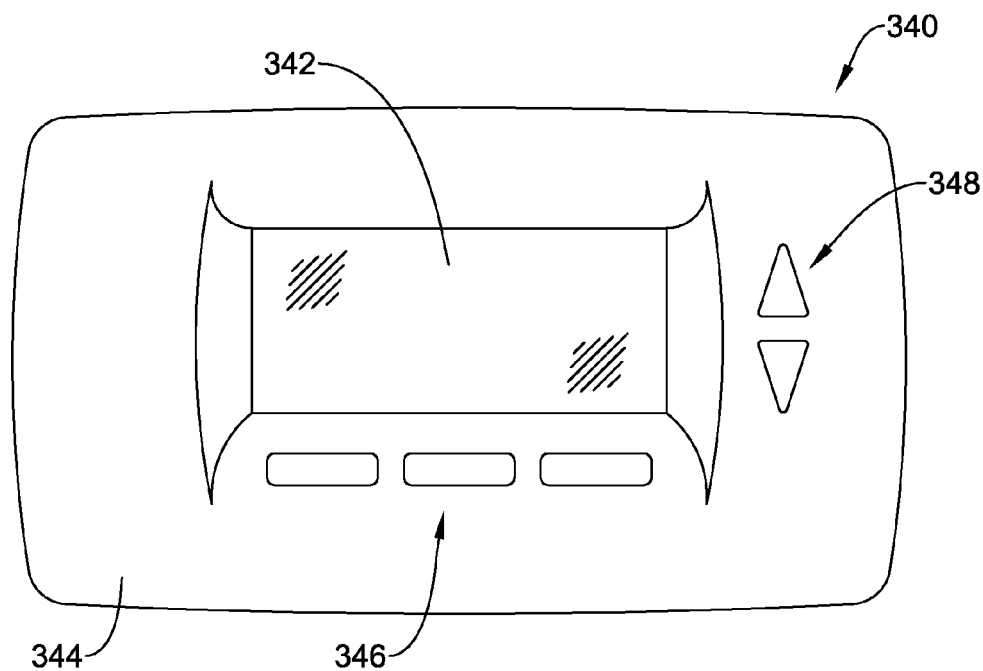
Figure 19:
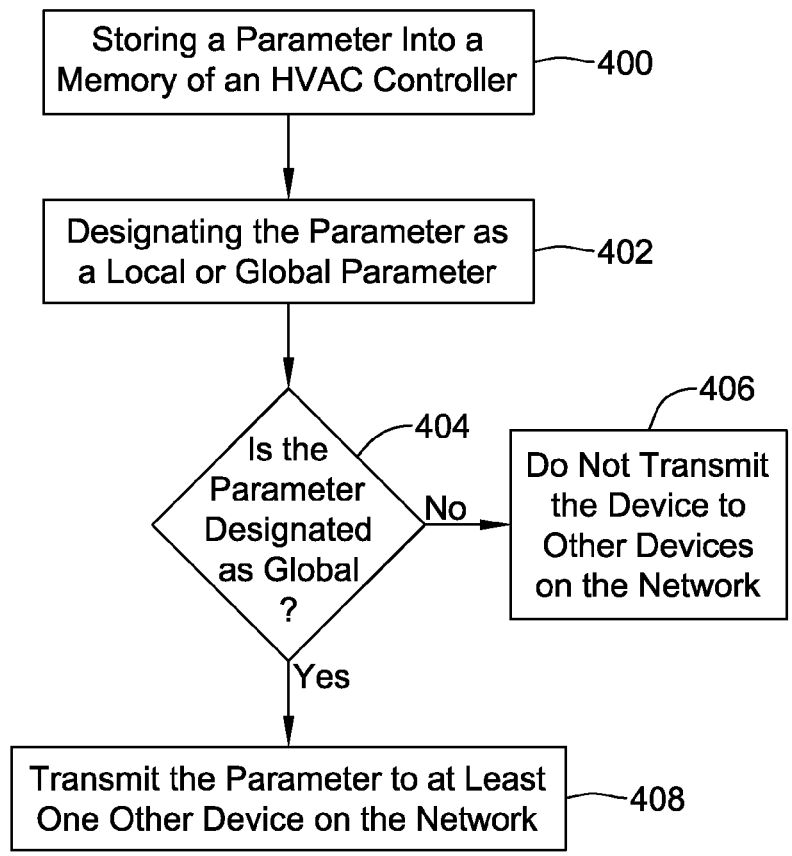
Figure 20:
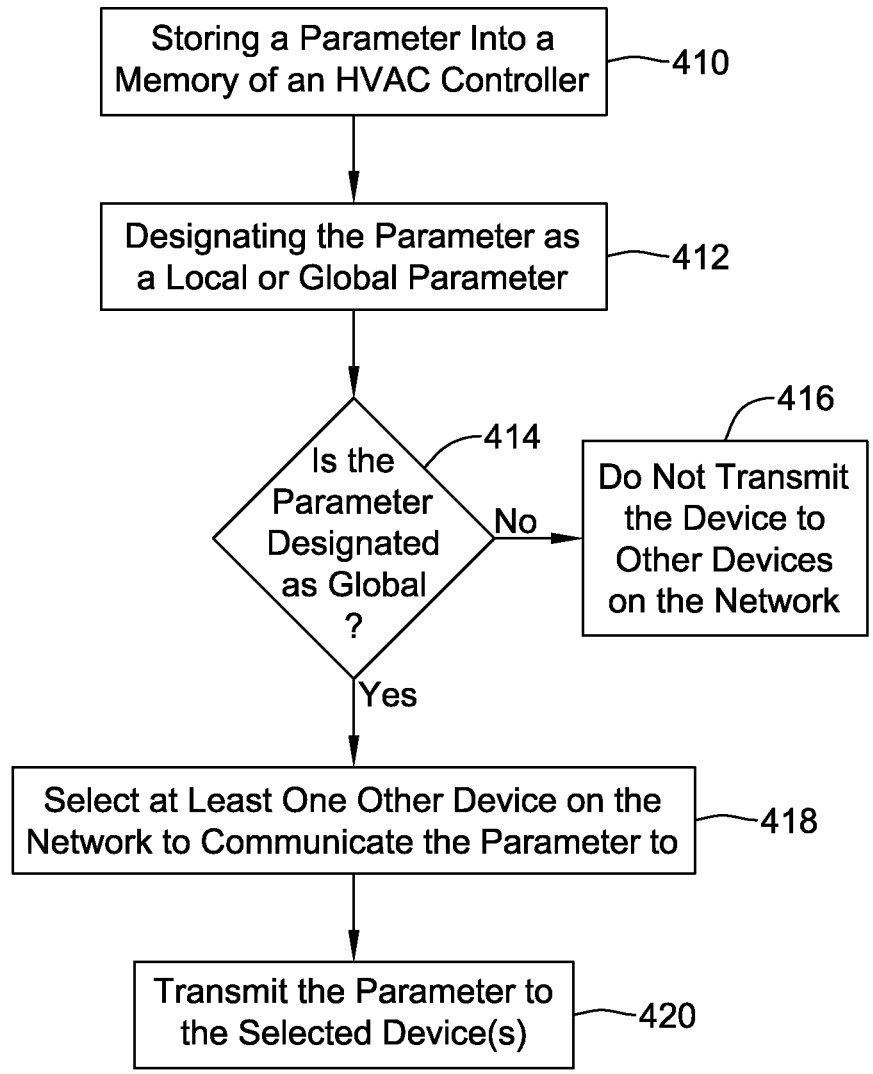

FIGS. 4 and 5 provide illustrative but non-limiting examples of screens that may be displayed on the HVAC controllers of FIGS. 2 and 3;

FIGS. 6 through 17 provide illustrative but non-limiting examples of screens pertaining to creating and/or editing a vacation schedule using the HVAC controllers of FIGS. 2 and 3;

FIG. 18 is a front perspective view of illustrative HVAC controllers;

FIG. 19 is flow diagram of an illustrative method for selectively communicating a parameter with at least one other device in the network; and FIG. 20 is flow diagram of another illustrative method for selectively communicating a parameter with at least one other selectable device in the network.

DETAILED DESCRIPTION

The following description should be read with reference to the drawings wherein like reference numerals indicate like elements throughout the several views. The detailed description and drawings show several embodiments which are meant to be illustrative of the claimed invention.

Figure 1:
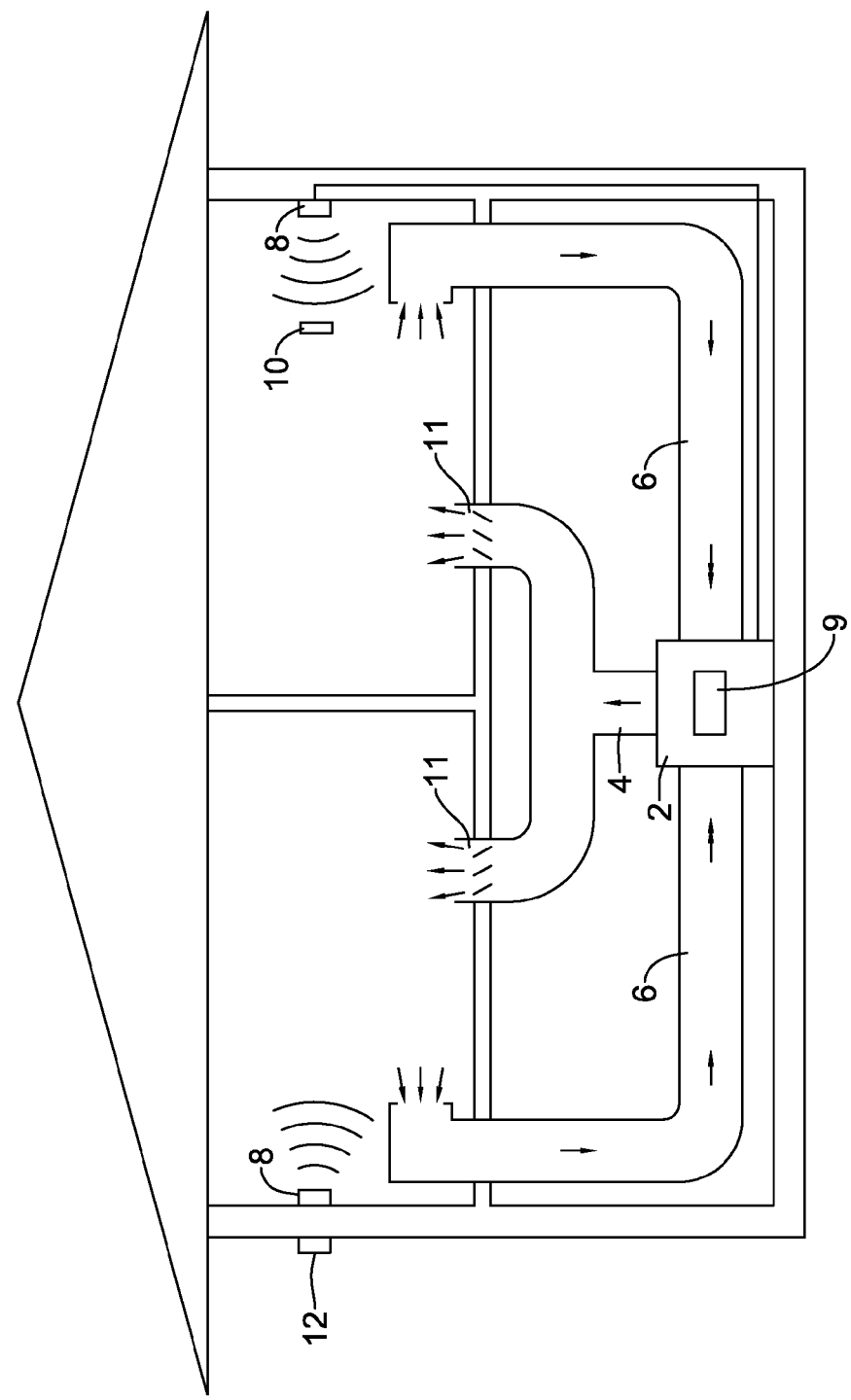
FIG. 1 is a schematic view of an example building or other structure including an illustrative heating, ventilation, and air conditioning (HVAC) system.

FIG. 1 is a schematic view of an example building or other structure including an HVAC system. While FIG. 1 shows a typical forced air type HVAC system, other types of HVAC systems may be used including hydronic systems, boiler systems, radiant heating systems, electric heating systems, or any other suitable type of HVAC system, as desired. The illustrative HVAC system of FIG. 1 includes one or more HVAC components 2, a system of vents or ductwork 4 and 6, and one or more HVAC devices, such as HVAC controllers 8. The one or more HVAC components 2 may include, but are not limited to, a furnace, a boiler, a heat pump, an electric heating unit, an air conditioning unit, a humidifier, a dehumidifier, an air exchanger, an air cleaner, and/or the like.

In the illustrative HVAC system shown in FIG. 1, the one or more HVAC components 2 can provide heated air (and/or cooled air) via the ductwork throughout the building or other structure. As illustrated, the one or more HVAC components 22 may be in fluid communication with every room and/or zone in the building or other structure via the ductwork 4 and 6. In operation, when a heat call signal is provided by one or more of the HVAC controllers 8, one or more HVAC components 2 (e.g. forced warm air furnace) may be activated to supply heated air to one or more rooms and/or zones within the building or other structure via supply air ducts 4. The heated air may be forced through supply air duct 4 by a blower or fan 9. In this example, the cooler air from each zone may be returned to the one or more HVAC components 2 (e.g. forced warm air furnace) for heating via return air ducts 6. Similarly, when a cool call signal is provided by one or more of the HVAC controllers 8, the one or more HVAC components 2 (e.g. air conditioning unit) may be activated to supply cooled air to one or more rooms and/or zones within the building or other structure via supply air ducts 4. The cooled air may be forced through supply air duct 4 by the blower or fan 9. In this example, the warmer air from each zone may be returned to the one or more HVAC components 2 (e.g. air conditioning unit) for cooling via return air ducts 6.

In some cases, the system of vents or ductwork 4 and 6 can include one or more dampers 11 to regulate the flow of air. For example, one or more dampers 11 may be coupled to one or more of the HVAC controllers 8 and can be coordinated with the operation of one or more HVAC components 2. The one or more HVAC controllers 8 may actuate dampers 11 to an open position, a closed position, and/or a partially open position to modulate the flow of air from the one or more HVAC components 2 to an appropriate room and/or zone in the building or other structure. The dampers 11 may be particularly useful in zoned HVAC systems, and may be used to control which zone(s) receives conditioned air from the HVAC components 2.

It is contemplated that the one or more HVAC controllers 8 may be configured to control the comfort level of the building or structure by activating and deactivating the one or more HVAC components 2. In some cases, the one or more HVAC controllers 8 may be thermostats, such as, for example, wall mountable thermostat, but this is not required in all embodiments. In some embodiments, the one or more HVAC controllers 8 may be wired, wireless, or both. In some embodiments, the HVAC controllers 8 may be zone controllers, each controlling the comfort level within a particular zone in the building or other structure. The one or more HVAC controllers 8 may be configured to control and/or set one or more functions and/or parameters, such as, for example, schedules, setpoints, trend logs, timers, and/or other building functions or parameters, as desired.

As shown in FIG. 1, the one or more HVAC controllers 8 may be configured to communicate with other HVAC controllers 8 or devices using a wireless communication protocol. The wireless communication protocol may include, for example, cellular communication, radio frequency (RF), Zig-Bee, Bluetooth, Wi-Fi, IEEE 802.11, IEEE 802.15, IrDA, dedicated short range communication (DSRC), EnOcean, or any other suitable wireless protocols, as desired. In one example, the wireless communication protocol may be operated on a wireless communication network such as, for example, RedLINK™, which is available from Honeywell International, Inc. If provided, the one or more HVAC controllers 8 may additionally or alternatively be configured to communicate using a wired communication protocol, such as, for example, the Building Automation and Control NETwork (BACnet) protocol, a master-slave/token-passing (MS/TP) protocol, LON, CBUS, ModBus, or any other suitable wired network protocol, as desired.

As shown in FIG. 1, other HVAC devices, such as device 12, may be provided in the example building or other structure. In some embodiments, device 12 may be a wireless outdoor temperature sensor. The wireless outdoor temperature sensor 12 may in wireless communication with the one or more HVAC controllers 8. The wireless outdoor temperature sensor 12 may be configured to sense an outdoor air temperature and, in some cases, wirelessly communicate the outdoor air temperature to the one or more HVAC controllers 8.

As shown in FIG. 1, a portable HVAC remote controller 10 may also be provided. In some cases, the HVAC remote controller 10 may be operatively connected in any suitable manner to one or more of the HVAC controllers 8 (e.g. one or more HVAC thermostats and/or one or more HVAC zone controllers) to provide remote temperature sensing and/or parameter setting control for the one or more HVAC controllers 8. In some cases, the HVAC remote controller 10 may be wirelessly connected to one or more of the HVAC controllers 8. The HVAC remote controller 10 may be a portable remote control unit that may allow a user to view, display and/or change one or more parameters of the corresponding HVAC controllers 8 and/or HVAC remote controller 10. The HVAC remote controller 10 may be movable by the user between multiple locations within the building or other structure. In a zoned HVAC system, there may be more than one HVAC controller 8 (or zone controllers), each controlling a corresponding zone within the building or other structure. When so provided, it is contemplated that the HVAC remote controller 10 may be operatively coupled to each of the HVAC controllers 8, either simultaneously, sequentially or by user selection.

In some cases, one or more of the HVAC controllers 8 may also be in wireless communication (wired or wireless) with one or more other wireless HVAC building devices. Example HVAC building devices may include, but are not limited to, HVAC zone controllers, humidity controllers, ventilation controllers, damper controllers, valve controllers, sensor controllers, AC units, heating units (e.g. boilers, furnaces, etc.), sensors (e.g. humidity, temperature, airflow, etc.), equipment interface modules, wireless adapters, and other building devices. In some embodiments, at least one of the one or more other wireless HVAC building devices may include a receiver, a transmitter, and/or transceiver for supporting wireless communication to communicate with the HVAC controller 8. The one or more other building HVAC devices may also include a processor (e.g. microprocessor or microcontroller) and/or a power source (e.g. battery), if desired.

In the illustrative embodiment, the one or more HVAC controllers 8 and/or other building devices may be configured to selectively communicate (wired and/or wirelessly) one or more parameters and/or settings to the other HVAC controller 8 and/or devices in the building network. In some embodiments, the one or more HVAC controllers 8 and/or other devices may be configured to designate each of the one or more parameters and/or settings as local or global. Global parameters and/or settings may be parameters and/or settings that may be communicated to one or more other controllers and/or devices on the network. Local parameters and/or settings may be parameters and/or settings that are not communicated to one or more other controllers and/or devices on the network. In some cases, when a parameter and/or setting is designated as global, the parameter and/or setting may be communicated to only some of the other controllers and/or devices on the network or, in other cases, may be communicated to all other controllers and/or devices on the network. In some instances, designating a parameter and/or setting as global may help to reduce installation time and errors as the parameter and/or setting may be communication to the other controllers and/or devices, and thus may not have to be manually entered in each device.

In some embodiments, the global parameter and/or setting may be communicated to only the other controllers and/or devices on the network that share a common accessory or device (e.g. outdoor wireless temperature sensor, furnace, damper zone, etc.). In some cases, by sharing the global parameter and/or setting with only other controllers and/or devices that share a common accessory or device, the likelihood of the global parameter and/or setting being shared across difference building control networks, such as, for example, in different or neighboring residential buildings, may be reduced. This is particularly true for wireless devices.

In some embodiments, one or more of the global parameters and/or settings may be communicated with selected controllers and/or devices. For example, a user may be able to include and exclude (e.g. select) certain controllers and/or devices to which the particular global parameter(s) and/or setting(s) are to be communicated with.

In some instances, a parameter may be designated as a global parameter during programming of the HVAC controller 8 in the factory and, when installed, the settings for the designated parameter may be automatically communicated to the other controllers and/or devices on the network. It is contemplated that the automatic global parameter may be determined on a parameter-by-parameter, if used.

FIG. 2 is a block diagram of an illustrative building controller 20 that may be used in conjunction with the HVAC system of FIG. 1. The illustrative building controller 20 of FIG. 2 may, for example, be a manifestation of each of the HVAC controllers 8 shown in FIG. 1, if desired. In some cases, building controller 20 may be considered to be a thermostat, but this is not required. In the illustrative embodiment, the building controller 20 includes a control module 22, a wireless interface 24, a user interface 26, and a memory 28.

Control module 22 of building controller 20 may be configured to help control the comfort level (i.e. heating, cooling, ventilation, air quality, etc.) of at least a portion of the building or structure by controlling whether one or more HVAC components 2 of HVAC equipment are activated or not. In some instances, control module 22 may include a processor, microcontroller and/or some other controller. Control module 22 may be configured to control and/or set one or more HVAC functions, such as, for example, HVAC schedules, temperature setpoints, humidity setpoints, trend logs, timers, environment sensing, HVAC controller programs, user preferences, and/or other HVAC functions or programs, as desired. In the illustrative embodiment, control module 22 may help control the comfort level of at least a portion of the building or structure using a temperature sensed by one or more temperature sensors, when provided.

Control module 22 may be configured to operate in accordance with an algorithm that controls or at least partially controls one or more components of an HVAC system. In some instances, the algorithm may include or reference a number of operating parameters. Examples of components that may be controlled by control module 22 include one or more of a furnace, a boiler for hot water heat or steam heat, a heat pump, an air conditioning unit, a humidifier, a dehumidifier, an air exchanger, an air cleaner, and the like. Control module 22 may, for example, operate in accordance with an algorithm that references an HVAC schedule with temperature set points, starting and/or ending times, and the like.

Memory 28 may be electrically connected to control module 22 and may be used to store any desired information, such as the aforementioned HVAC schedules, temperature setpoints, humidity setpoints, trend logs, timers, environmental settings, and any other settings and/or information as desired. Memory 28 may include any suitable type of memory, such as, for example, random-access memory (RAM), read-only member (ROM), electrically erasable programmable read-only memory (EEPROM), Flash memory, or any other suitable memory, as desired.

Control module 22 may store information, such as a plurality of parameters, within memory 28, and may subsequently retrieve the stored information from the memory 28. The control module 22 may be configured to designate at least some of the plurality of parameters as a global parameter or a local parameter. In some embodiments, at least one of the parameters is designated as a local parameter and at least one of the parameters is designated as a global parameter. In some cases, the control module 22 may be configured to identify and store which of the other HVAC controllers and/or devices in an HVAC system to which the global parameters are to be shared.

Wireless interface 24 of the illustrative HVAC controller 20 may be electrically connected to control module 22 and may be configured to wirelessly communicate (i.e. transmit and/or receive signals) with a wireless interface of one or more other HVAC controllers 8 and devices (and/or HVAC components 2). For example, control module 22 may be configured to communicate with a wireless interface of other HVAC controllers 8 (see FIG. 1) via wireless interface 24 to send and/or receive signals that corresponding to, for example, the global parameters (e.g. schedules, set points, trend logs, and/or other parameters designated as global), a temperature sensed by temperature sensor, a humidity sensed by the humidity sensor, indoor and/or outdoor air temperatures, equipment status, and/or any other suitable information and/or data. In some embodiments, the control module 22 may be configured to communicate the parameters marked as global parameters, but not parameters marked as local parameters, if desired. It is contemplated that the wireless interface 24 may include, for example, a radio frequency (RF) wireless interface, an infrared wireless interface, a microwave wireless interface, an optical interface, and/or any other suitable wireless interface, as desired.

User interface 24 may be any suitable interface that is electrically connected to control module 22 and configured to display and/or solicit information as well as permit a user to enter data and/or other parameters and/or settings such as temperature set points, humidity set points, starting times, ending times, and/or the like, as desired. In some cases, user interface 26 of the building controller 20 may allow a user (e.g. owner, technician, or other person) to program and/or modify one or more control parameters of building controller 20, such as programming set points, start and stop times, equipment status and/or other parameters, as desired. Alternatively, or in addition, user interface 26 may allow a user to program and/or modify one or more control parameters of the building controller 20. In some cases, the user interface 24 may be configured to allow a user to designate a particular parameter or group of parameters as global parameters or local parameters with one or more inputs. In some cases, the user interface 24 may also allow a user to select one or more other controllers and/or devices to which the global parameters is/are to be shared, if desired. In some instances, the user interface 26 may include a touch screen, a liquid crystal display (LCD) panel and keypad, a dot matrix display, a computer, one or more buttons and/or any other suitable user interface, as desired.

In some cases, the building controller 20 may also include or have access to one or more sensors, such as a temperature sensor, a humidity sensor, a ventilation sensor, an air quality sensor, and/or any other suitable building control system sensor, as desired. In some cases, building controller 20 may also include a data port configured to communicate with control module 22 and may, if desired, be used to either upload information to control module 22 or to download information from control module 22. Information that can be uploaded or downloaded may include values of operating parameters, settings, firmware, and/or any other suitable information, as desired.

FIG. 3 is a front view of an illustrative HVAC controller 30. In some instances, HVAC controller 30 may represent a manifestation of HVAC controller 10 of FIGS. 1 and 2, but this is not required. The illustrative HVAC controller 30 includes a display 32 that is disposed within a housing 34. In some cases, display 32 may be at least a portion of the user interface of the HVAC controller 30. Display 32 may be a touch screen display, a liquid crystal display (LCD) panel, a dot matrix display, a fixed segment display, a cathode ray tube (CRT), or any other suitable display, as desired. A dot matrix display is typically an LCD display that permits images such as letters, numbers, graphics, and the like to be displayed anywhere on the LCD, rather than being confined to predetermined locations such as is the case with a fixed segment LCD. Housing 34 may be formed of any suitable material, such as a polymeric, metallic, or any other material, as desired. In some cases, the display 32 may be either inset or recessed within the housing 34 as shown.

In some cases, HVAC controller 30 may be configured to provide substantial display and/or programming functionality. FIGS. 4 through 17 provide some examples of screens that may be displayed by HVAC controller 30 during operation. In some cases, home screens may include a top level navigational menu. In some cases, a home screen can be displayed by HVAC controller 30 as a default screen, when no other data entry is underway, and/or when selected by the user. A home screen may, if desired, display one or more parameters relating to environmental conditions such as indoor and/or outdoor temperature and/or humidity, expected weather conditions, set points, time, equipment status, and/or any other suitable parameter or setting, as desired. In some cases, the home screen may vary depending on the HVAC system that the HVAC controller 30 is operatively engaged in helping to control (e.g. zone HVAC system, non-zoned HVAC system, programmable HVAC controller, non-programmable HVAC controller, etc.).

In FIG. 4, HVAC controller 30 is displaying on display 32 a home screen 44 that includes a navigational bar 46 that may be considered as providing top level navigation. In some cases, if desired, navigation bar 46 may include one or more of a HOME button 48, a FAN button 50, a HEAT/COOL button 52 and/or a MENU button 54. The function of each button within navigational bar 46 may be similar to that described in U.S. application Ser. No. 12/323,394, filed Nov. 25, 2008, and entitled "METHOD AND APPARATUS FOR CONFIGURING AN HVAC CONTROLLER", which is hereby incorporated by reference. FIG. 4 is an example screen that may be displayed after a user has pushed HOME button 48.

In some cases, home screen 44 may be considered as having two or more regions. For example, home screen 44 may include a first region 56 and a second region 58. In some instances, first region 56 may be considered as displaying or otherwise providing primary information while second region 58 may be considered as displaying or otherwise providing secondary information. In some cases, primary information may be information that is considered to be more important, more interesting and/or more useful than secondary information. To illustrate, first region 56 may display one or more of a current temperature reading, a current indoor humidity, a schedule status, and the like. Second region 58 may display one or more of a date and time, an outdoor temperature reading, an outdoor humidity reading, an equipment status, and the like.

Home screen 44 may also include a third region 60 that may be used for displaying and/or adjusting a parameter value such as a parameter that is displayed within first region 56 of home screen 44. In some cases, for example, third region 60 may include a parameter 62, an up arrow 64 and a down arrow 66. The value of parameter 62 may be increased or decreased using, as necessary, up arrow 64 and/or down arrow 66.

As illustrated, second region 58 may refer to a left-hand section of home screen 44, third region 60 may refer to a right-hand section of home screen 44 and first region 56 may refer to a center section of home screen 44 that is between second region 58 and third region 60. In some instances, however, one or more of first region 56, second region 58 and/or third region 60 may instead be aligned vertically above or below the other regions within home screen 44, as desired.

FIG. 5 provides an illustrative home screen 70 that may be displayed if Menu button 54 of FIG. 4 is pressed. HVAC controller 30 may display a variety of menu items within first region 56 and/or within second region 58. Third region 60 may include up scroll button 72 and down scroll button 74 to scroll up and down the displayed menu items, if necessary. These menu items may permit a homeowner, technician or other individual to set a variety of parameters of HVAC controller 30. For example, as illustrated in FIG. 5, home screen 70 may include one or more of a Create/Edit Schedule button 76, a Vacation Mode button 78, an Humidification button 80, a Dehumidification button 82, a Ventilation button 84, a System Information button 86, a Date/Time button 88, a Preferences button 90, a Temporary Schedule Changes button 92, a Schedule Fan button 94, a Southern Dehumidification Mode button 96, a Find Remote button 98, a Clean Screen button 100, a Security Settings button 102 and/or an Installer Set Up button 104. If a button is pressed, one or more subsequent screens may be displayed by HVAC controller 30 for accessing one or more sub-menus, when desired.

Figure 6:
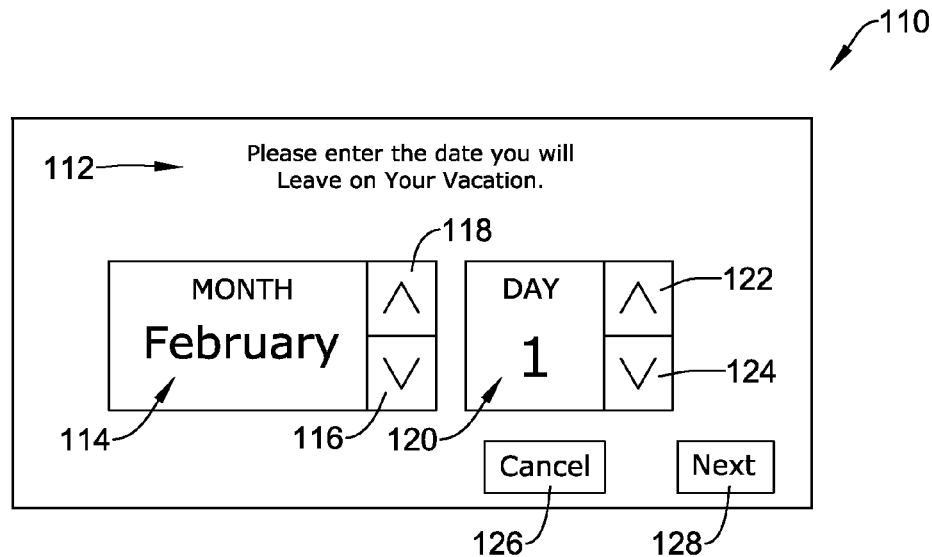

FIGS. 6 through 17 provide illustrative but non-limiting examples of screens that may be displayed by HVAC controller 30 pertaining to creating, editing and/or viewing a vacation schedule within HVAC controller 30. In particular, FIG. 6 shows an illustrative screen 110 that may be displayed by HVAC controller 30 in response to someone pressing or otherwise selecting Vacation Mode button 78 of FIG. 5.

Referring to FIG. 6, screen 110 may include text 112 that instructs the user to enter the date that they will be leaving on vacation. A Month block 114 displays a month, and Up arrow 118 and/or Down arrow 116 may be used to scroll up and/or down to the desired month. A Date block 120 displays a day of the month that can be adjusted up or down using Up arrow 122 and/or Down arrow 124 as desired. As illustrated, the date is displayed using numbers 1 through 31. In some cases, the corresponding day of the week (Monday, Tuesday, Wednesday, Thursday, Friday, Saturday and Sunday) may also be displayed, but this is not required. Cancel button 126 may, if pressed, cause HVAC controller 30 to revert to screen 70 (FIG. 5).

Figure 7:
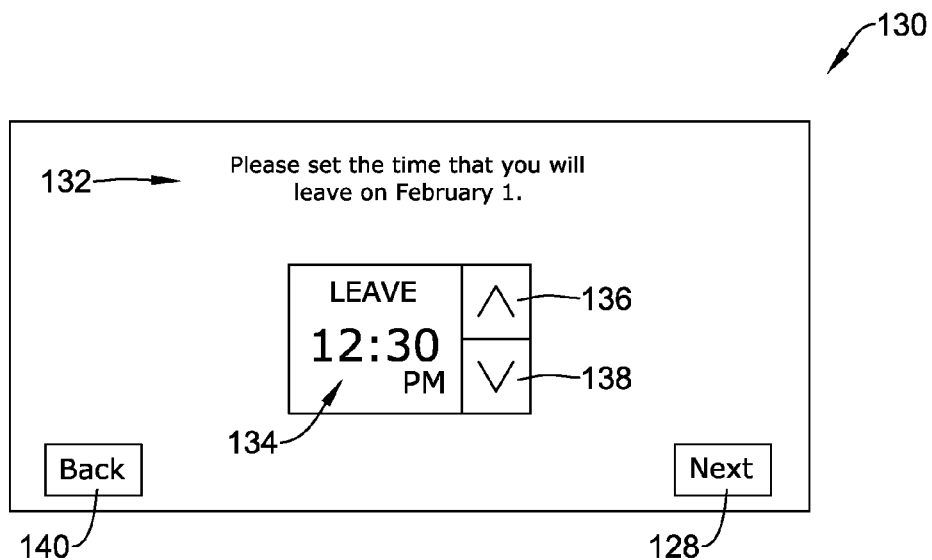

Pressing Next button 128 may cause HVAC controller 30 to display an illustrative screen 130, as shown in FIG. 7. Screen 130 may include text 132 that instructs the user to set the time that they will be leaving on vacation. In some cases, as illustrated, text 132 may reference the date previously set with respect to screen 110 (FIG. 6) but this is not required. A time block 134 displays a departure time that can be adjusted using Up arrow 134 and/or Down arrow 136, as appropriate. Back button 140 permits the user to return to the previous screen, if, for example the date was set incorrectly.

Figure 8:
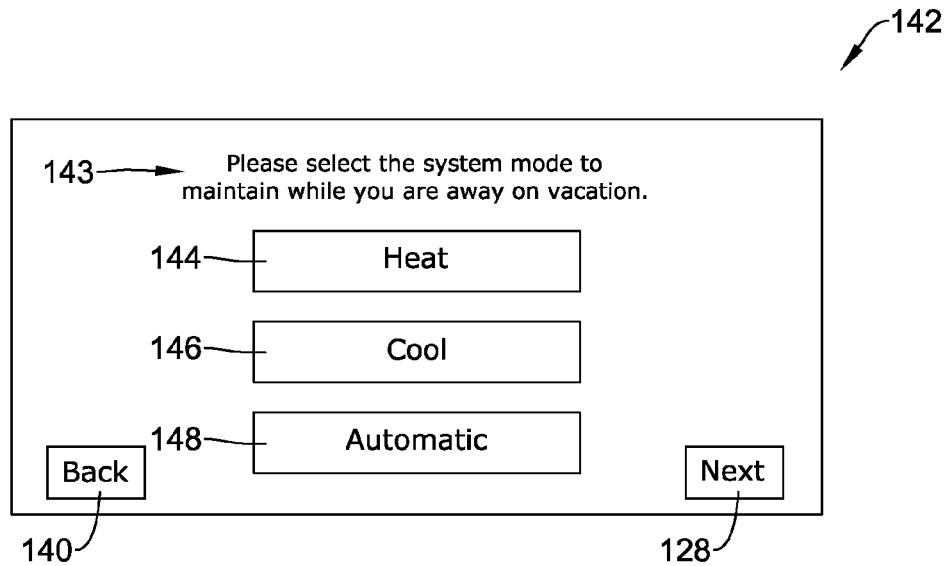

Pressing Next button 128 may cause HVAC controller 30 to display an illustrative screen 142, shown in FIG. 8. In some cases, screen 142 may include text 143 instructing the user to select the system mode to maintain while they are on vacation. In some instances, screen 142 may include a heat button 144 for selecting heating mode, a cool button 146 for selecting cooling mode, and an automatic button 148 for selecting an automatic mode that may heat or cool, depending on the environmental conditions. Back button 140 permits the user to return to the previous screen, if desired.

Figure 9:
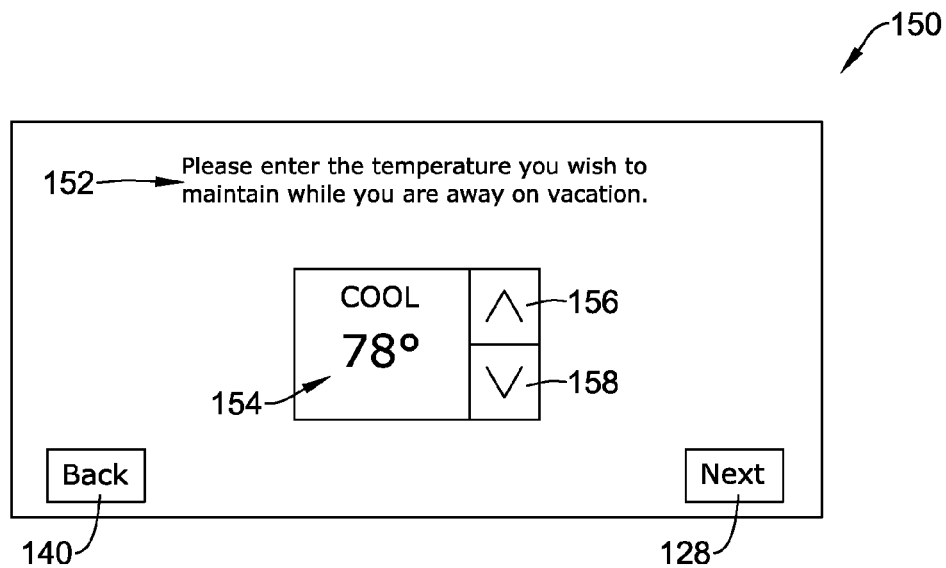

Pressing Next button 128 may cause HVAC controller 30 to display an illustrative screen 150, shown in FIG. 9. In some cases, screen 150 may include text 152 instructing the user to enter a temperature that they want to maintain while they are on vacation. In some instances, as illustrated, screen 150 may include a cooling temperature block 154 displaying a cooling temperature set point when cool button 142 is pressed in screen 142 (FIG. 8). In other instances, a heating temperature block displaying a heating temperature set point may be displayed or, in yet other instances, both a heating temperature block and a cooling temperature block may be displayed. Cooling temperature block 154 may include UP arrow 156 and Down arrow 158 for adjusting cooling temperature set point as desired. Back button 140 permits the user to return to the previous screen, if desired.

Figure 10:
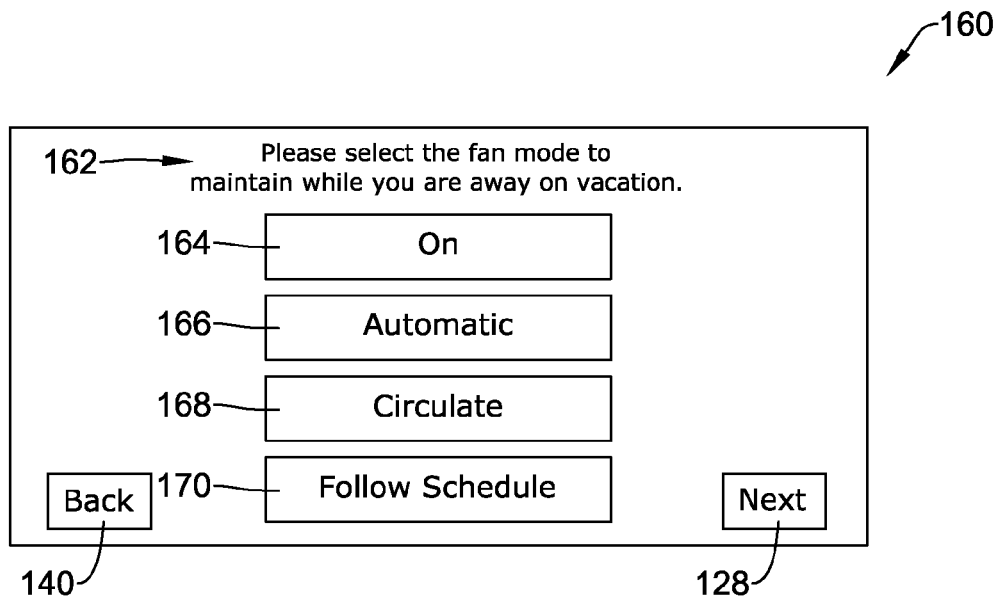

Pressing Next button 128 may cause HVAC controller 30 to display an illustrative screen 160, as shown in FIG. 10. Screen 160 may include text 162 that instructs the user to select the fan mode to maintain while you are away on vacation. Screen 160 may show fan modes available in the installed system. In some instances, screen 160 may include an on button 164 for selecting a fan on mode, an automatic button 166 for selecting an automatic fan mode, a circulate button 168 for selecting a circulate fan mode, and a follow schedule button 170 for following the schedule. Back button 140 permits the user to return to the previous screen, if desired.

Figure 11:
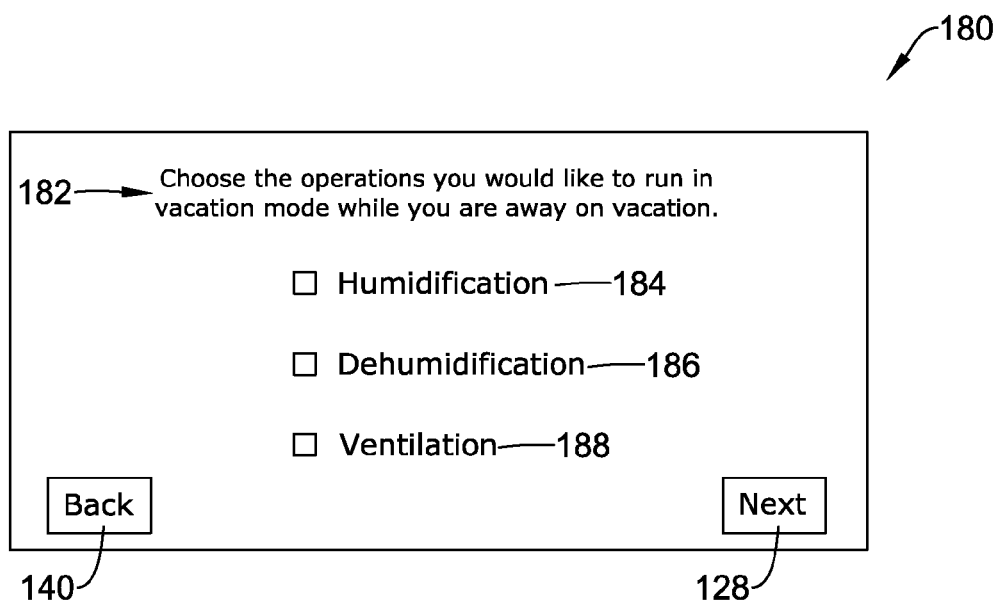

Pressing Next button 128 may cause HVAC controller 30 to display an illustrative screen 180, as shown in FIG. 11. Screen 180 may include text 182 that instructs the user to choose the operations you would like to run in vacation mode while you are away on vacation. In some cases, screen 180 may be configured to display only options that are installed in the HVAC system. In some instances, screen 180 may include a humidification option 184, a dehumidification option 186, and a ventilation option 188. A user may select the option by the screen next to the desired option to put a check in the box next to the desired option. In some cases, a help button 178 may be provided to provide additional information to the user. Back button 140 permits the user to return to the previous screen, if desired.

Figure 12:
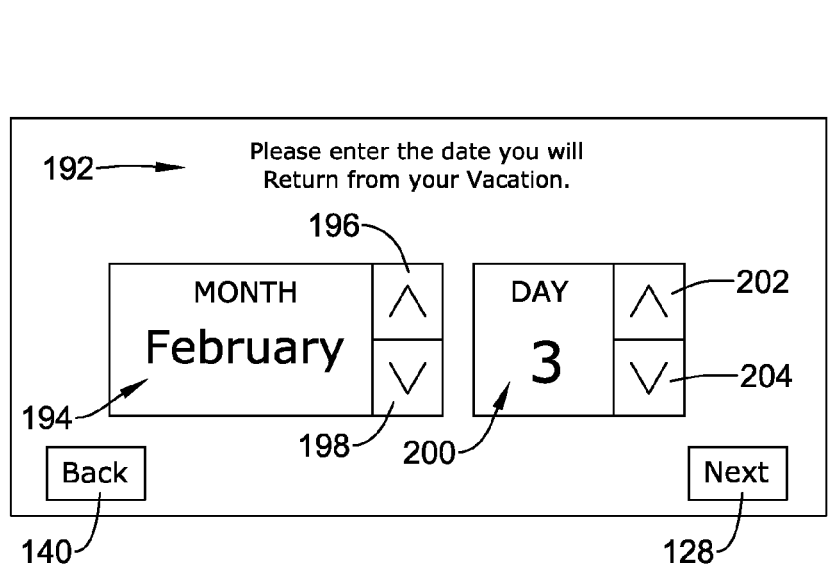

Pressing Next button 128 may cause HVAC controller 30 to display an illustrative screen 190, as shown in FIG. 12. Screen 190 may include text 192 that instructs the user to enter the date that they will be returning from vacation. A Month block 194 displays a month, and Up arrow 196 and/or Down arrow 198 may be used to scroll up and/or down to the desired month. A Date block 200 displays a day of the month that can be adjusted up or down using Up arrow 202 and/or Down arrow 204 as desired.

Figure 13:
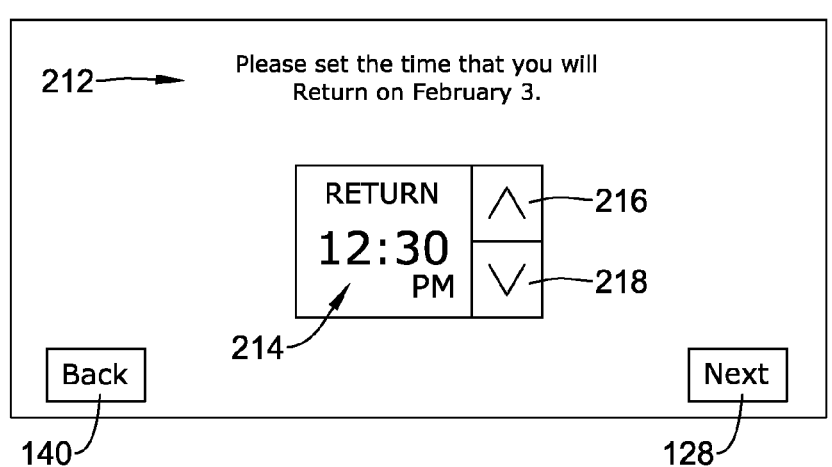

Pressing Next button 128 may cause HVAC controller 30 to display an illustrative screen 210, as shown in FIG. 13. Screen 210 may include text 212 that instructs the user to set the time that they will be returning from vacation. In some cases, as illustrated, text 212 may reference the date previously set with respect to screen 190 (FIG. 12) but this is not required. A time block 214 displays a return time that can be adjusted using Up arrow 216 and/or Down arrow 218, as appropriate. Back button 140 permits the user to return to the previous screen, if, for example the date was set incorrectly.

Figure 14:
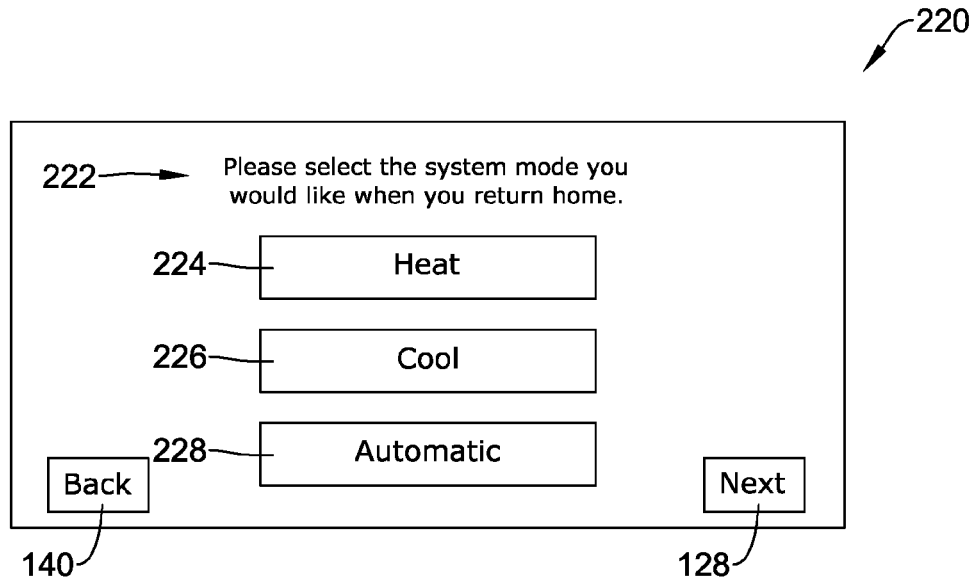

Pressing Next button 128 may cause HVAC controller 30 to display an illustrative screen 220, shown in FIG. 14. In some cases, screen 220 may include text 222 instructing the user to select the system mode you would like when you return home. In some instances, screen 220 may include a heat button 224 for selecting heating mode, a cool button 226 for selecting cooling mode, and an automatic button 228 for selecting an automatic mode that may heat or cool, depending on the environmental conditions. Back button 140 permits the user to return to the previous screen, if desired.

Figure 15:
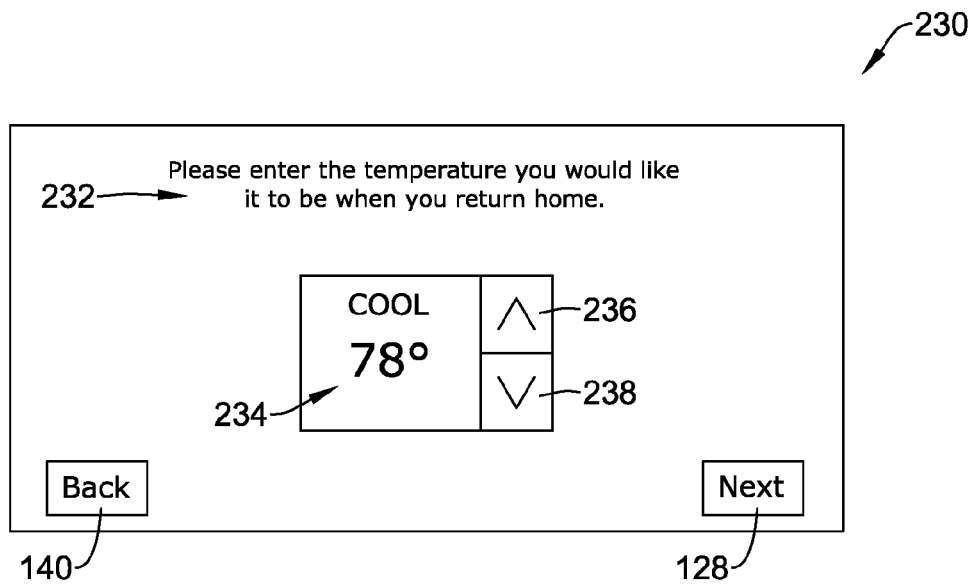

Pressing Next button 128 may cause HVAC controller 30 to display an illustrative screen 230, shown in FIG. 15. In some cases, screen 230 may include text 232 instructing the user to enter a temperature that they want when they return from vacation. In some instances, as illustrated, screen 230 may include a cooling temperature block 234 displaying a cooling temperature set point when cool button 226 is pressed in screen 220 (FIG. 14). In some cases, screen 230 may include a heating temperature block displaying a heating temperature set point and/or a cooling temperature block, as desired. Cooling temperature block may include UP arrow 236 and Down arrow 238 for adjusting temperature settings as desired. Back button 140 permits the user to return to the previous screen, if desired.

Figure 16:
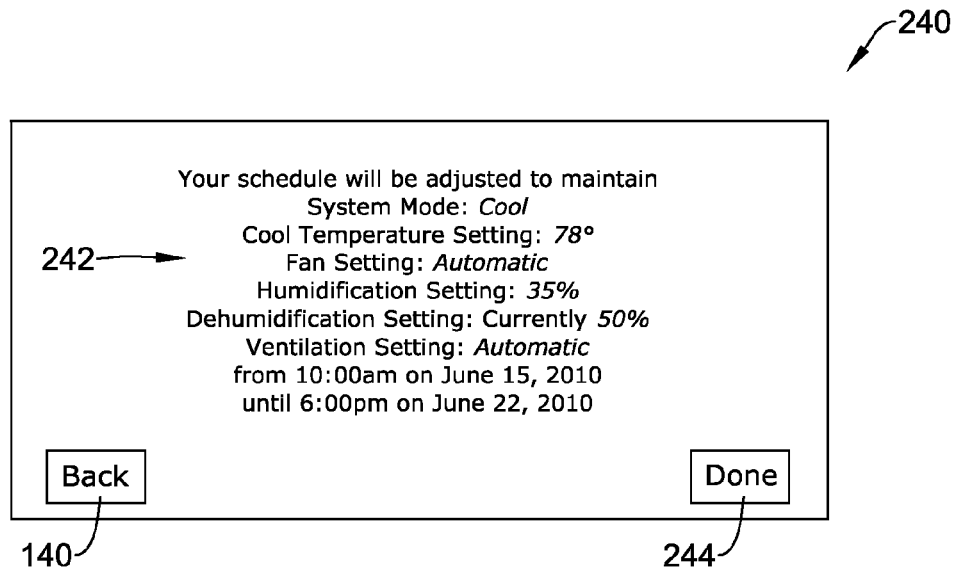

Pressing Next button 128 may cause HVAC controller 30 to display an illustrative screen 240, as shown in FIG. 16. Screen 240 may include text 242 that reviews the vacation mode settings. If there is an error, or the user wishes to make any changes, they may do so by pressing Back button 140 and HVAC controller 30 will provide the appropriate screens to make any necessary changes. If the user agrees with the vacation settings, they may inform HVAC controller 30 thereof by pressing Done button 244.

Figure 17:
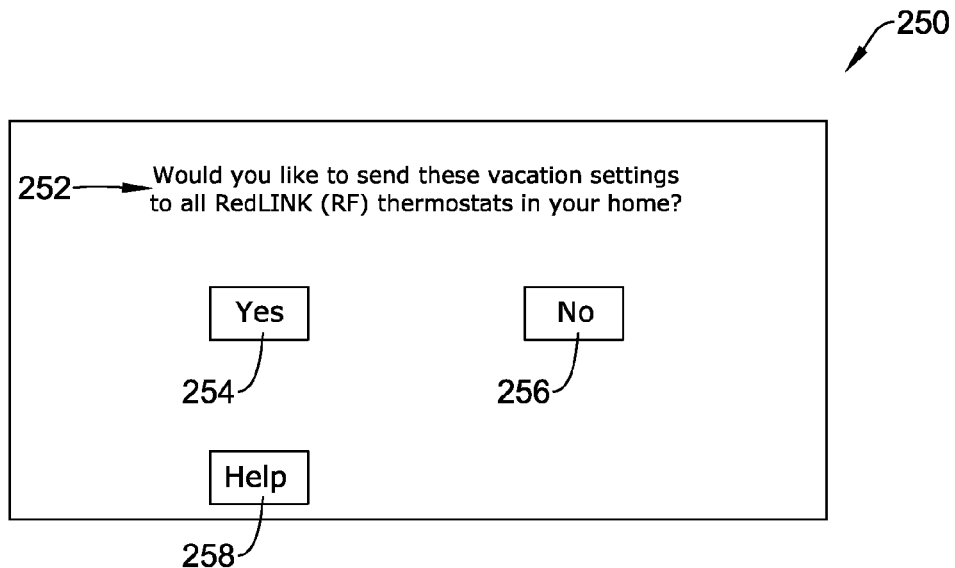

Illustrative screen 250 of FIG. 17 may be displayed on HVAC controller 30 after the user presses Done button 244 of FIG. 16. Screen 250 may include text 252 asking the user if you would like to send these vacation settings to all RedLINK (RF) thermostats in their home. In other words, text 252 is asking the user if the vacation mode should be set as a global parameter to be shared with other devices in the HVAC system. Screen 250 may display a Yes box 254 for selecting to share the vacation mode settings with other thermostats (e.g. setting the vacation mode as global), and a No box 256 for selecting not to share the vacation mode settings with other thermostats (e.g. setting the vacation mode as local). In some instances, a help box 258 may be displayed to provide further information and help. For example, pressing help button 258 may indicate the thermostats that the vacation mode will/ could be shared with. In one instance, the vacation mode settings may only be shared with other thermostats or HVAC controllers that share a common wireless accessory (e.g. output wireless sensor). However, other manners of determining how/when to share the vacation mode settings may be used.

In some embodiments, although not shown, it is contemplated that a screen may be displayed on HVAC controller 30 allowing a user to select the devices on the HVAC network with which the vacation mode setting may be shared. In some case, a listing of devices may be displayed, and the user may be provided with an option to select which of the devices with which to share, if any. When so provided, and in some cases, the listing of devices may be tailored so that only relevant devices are listed. For example, the above-mentioned vacation mode settings may not be relevant to a non-programmable thermostat located in, for example, a garage of a home. As such, this non-programmable thermostat may not be provided in the listing of device for selection to share the vacation mode settings.

Further, while the illustrative screens have been provided showing how to designate the vacation mode settings as global or local parameters, it is contemplated that similar manners may be used to set other parameters and/or settings as global or local parameters, as desired. In some cases, some or all of the parameters may be set to a default global or local setting at the factory.

FIG. 18 is a front view of alternative illustrative HVAC controller 340 that may be used. In some instances, HVAC controller 340 may represent a manifestation of HVAC controller 10 of FIGS. 1 and 2, but this is not required. The illustrative HVAC controller 340 includes a display 342 and one or more buttons 346 and 348 that are disposed within a housing 344. In some cases, display 342 and one or more buttons 346 and 348 may be at least a portion of the user interface of the HVAC controller 340. Display 342 may be a liquid crystal display (LCD) panel, a dot matrix display, a fixed segment display, a cathode ray tube (CRT), or any other suitable display, as desired. Buttons 346 and 348 may allow a user to navigate through a menu and set/edit one or more parameters and/or settings of the HVAC controller 340. Housing 344 may be formed of any suitable material, such as a polymeric, metallic, or any other material, as desired. In some cases, the display 342 may be either inset or recessed within the housing 344 as shown.

FIG. 19 is flow diagram of an illustrative method for selectively communicating a parameter with at least one other device in the network. As shown in block 400, a parameter may be stored into a memory of an HVAC controller. In some embodiments, the parameter may be entered into the HVAC controller via a user interface, such as user interface 26. Example parameters and/or settings may include vacation settings, alerts/reminders, dehumidification away mode, standard/economy mode, weather forecast, daylight savings, temperature format, dealer information, language configuration, offset adjustment for humidity and temperature, as well as other parameter or settings, as desired. In block 402, the parameter may be designated as a local parameter or a global parameter. In some cases, the designation may be entered by a user or technician via user interface 26. In some cases, the designation may be entered during programming of the parameter and/or setting. For example, certain parameters and/or settings may be programmed as global parameter and may be automatically communicated to other devices when entered. In some cases, some or all of the parameters may be set to a default global or local setting at the factory.

In decision block 404, the HVAC controller may determine if the parameter and/or setting is designated as a global parameter. If the parameter and/or setting is not designated as a global parameter (i.e. it is designated as a local parameter) in decision block 404, then in block 406, the HVAC controller may not transmit the parameter to other devices in the building network. In other words, the parameter may remain local to the HVAC controller. If the parameter is determined to be designated as a global parameter in decision block 404, in block 408, the HVAC controller may transmit (wired and/or wirelessly) the parameter to at least one other device on the network. In some cases, the global parameter may be communicated to all the other devices on the network or, in other cases, to only some of the devices on the network. In one example, the global parameter may be communicated to all devices that share a common device, such as an outdoor temperature sensor. This method may be repeated for a second, third, fourth, fifth, or any number of parameters that are to be stored in the memory of the HVAC controller.

FIG. 20 is flow diagram of another illustrative method for selectively communicating a parameter with at least one other selectable device in the network. As shown in block 410, a parameter may be stored into a memory of an HVAC controller. In some embodiments, the parameter may be entered into and/or changed via a user interface, such as user interface 26. Example parameters and/or settings may include vacation settings, alerts/reminders, dehumidification away mode, standard/economy mode, weather forecast, daylight savings, temperature format, dealer information, language configuration, offset adjustment for humidity and temperature, as well as other parameter or settings, as desired. In block 412, the parameter may be designated as a local parameter or a global parameter. In some cases, the designation may be entered by a user or technician via user interface 26. In some cases, the designation may be entered during programming of the parameter and/or setting. Certain parameters and/or settings may be programmed as global parameter, and may be automatically communicated to other devices when entered.

In decision block 414, the HVAC controller may determine if the parameter and/or setting is designated as a global parameter. If the parameter and/or setting is not designated as a global parameter (i.e. local parameter) in decision block 414, then in block 416, the HVAC controller may not transmit the parameter to other devices in the building network. In other words, the parameter may remain local to the HVAC controller. If the parameter is determined to be designated as a global parameter in decision block 414, in block 418, a user or technician may select at least one other device on the network to communicate the global parameter with. In some cases, the user and/or technician may be able to select all devices or some selected devices on the network. Then in block 420, the HVAC controller may transmit the parameter to the selected devices device. This method may be repeated for a second, third, fourth, fifth, or any number of parameters that are to be stored in the memory of the HVAC controller.

Having thus described the preferred embodiments of the present invention, those of skill in the art will readily appreciate that yet other embodiments may be made and used within the scope of the claims hereto attached. Numerous advantages of the invention covered by this document have been set forth in the foregoing description. It will be understood, however, that this disclosure is, in many respect, only illustrative. Changes may be made in details, particularly in matters of shape, size, and arrangement of parts without exceeding the scope of the invention. The invention's scope is, of course, defined in the language in which the appended claims are expressed.

What is claimed is:
1. A building controller for controlling one or more building components, comprising:
a wireless interface;
a memory;
a user interface including a display;

a control module in communication with the wireless interface, the memory, and the user interface;

the control module configured to store a plurality of building control parameters in the memory, wherein at least one of the plurality of building control parameters relates to an environmental condition inside the building, wherein the control module provides one or more control signals for controlling the one or more building components in accordance with the plurality of building control parameters;

the control module is further configured to display one or more screens on the display that provide a user, via the user interface of the building controller, a choice between local and global as a designation for at least one of the plurality of building control parameters;

the control module is further configured to transmit the building control parameters that are designated as global parameters to a remote building controller via the wireless interface while not transmitting the building control parameters that are designated as local parameters to the remote building controller; and the control module is further configured to receive one or more building control parameters that are designated as global parameters by the remote building controller and/or another remote building controller via the wireless interface, but not receiving building control parameters that are designated as local parameters by the remote building controller and/or another remote building controller, and storing the one or more received building control parameters in the memory for use by the control module to provide one or more control signals for controlling the one or more building components.

2. The building controller of claim 1, wherein each of the plurality of building control parameters can be designated as local or global using one or more inputs received via the user interface of the building controller, wherein the designation of each parameter is changeable from local to global and/or from global to local.

3. The building controller of claim 1, wherein the user interface includes the display and one or more buttons.

4. The building controller of claim 1, wherein the display includes a touch screen display.

5. The building controller of claim 1, wherein at least one of the plurality of building control parameters is designated as a local parameter using one or more inputs received from the user via the user interface of the building controller and at least one of the plurality of building control parameters is designated as a global parameter using one or more inputs received from the user via the user interface of the building controller.

6. The building controller of claim 1, wherein the one or more building components comprises an HVAC system.

7. A building control system, comprising:
a first building control device including:
a first wireless interface;
a first memory;
a first user interface configured to interface with a user; and
a first controller in communication with the first user interface, the first wireless interface, and the first memory, the first controller configured to store a plurality of building control parameters in the first memory, wherein at least one of the plurality of building control parameters relates to an environmental condition inside the building, wherein each of the plurality of building control parameters is configured to be designated as either a global parameter or a local parameter, wherein the designation of each parameter is changeable from local to global and/or from global to local, the first controller configured to control the first building control device in accordance with the plurality of building control parameters, wherein at least some of the plurality of building control parameters stored in the first memory are designated as local or global via one or more inputs received via the first user interface of the first building control device;

a second building control device including:
a second wireless interface, wherein the first controller is configured to transmit via the first wireless interface those building control parameters designated as global parameters to the second building control device via the second wireless interface, while not transmitting those building control parameters designated as local parameters;
a second memory; and
a second controller in communication with the second wireless interface and the second memory, the second controller configured to store the plurality of global parameters received via the second wireless interface in the second memory;
the second controller is further configured to provide one or more control signals for controlling one or more building components in accordance with at least some of the plurality of global parameters received via the second wireless interface and stored in the second memory.

8. The building control system of claim 7, wherein the building control parameters designated as local are not transmitted to the second building control system device.

9. The building control system of claim 8, wherein each of the plurality of building control parameters stored in the first memory can be designated as local or global via one or more inputs received via the first user interface.

10. The building control system of claim 7, wherein the building control parameters transmitted to the second wireless interface via the first wireless interface and stored in the second memory are automatically designated as global parameters by the second controller.

11. The building control system of claim 10, wherein the second building control device includes a second user interface for inputting one or more local building control parameters into the second building control device.

12. The building control system of claim 11, wherein the one or more local building control parameters input into the second building control device are stored in the second memory and designated as local parameters.

13. The building control system of claim 7, wherein the user interface includes a display and one or more buttons.

14. The building control system of claim 7, wherein the user interface includes a touch screen display.

15. A method of configuring a plurality of devices on a building control system network that includes a plurality of building control devices that are configured to wirelessly communicate over a building control system network, where each of the plurality of building control devices includes a memory configured to store a number of building control parameters, where at least one of the building control parameters relates to an environmental condition inside a building, the method comprising:
storing a first building control parameter in a first memory of a first building control device of the plurality of building control devices, wherein the first building control parameter is field programmable to be designated as either a global parameter or a local parameter using a user interface of the first building control device;

a user choosing a designation for the first building control parameter stored in the first memory, wherein the user chooses between global and local as the designation for the first building control parameter, wherein the choice is made in the field using the user interface of the first building control device;

if the first building control parameter is chosen by the user to be a global parameter, transmitting the first building control parameter from the first building control device to a second building control device that is remote from the first building control device, storing the first building control parameter in a second memory of the second building control device, and providing one or more control signals from the second building control device for controlling one or more building components based at least in part on the first building control parameter that is stored in the second memory; and if the first building control parameter is chosen by the user to be a local parameter, not transmitting the first building control parameter from the first building control device to the second building control device.

16. The method of claim 15, further comprising:

storing a second building control parameter in the first memory of the first building control device;

designating the second building control parameter as either a global parameter or a local parameter in the field using the user interface of the first building control device;

if the second building control parameter is designated as a global parameter, transmitting the second building control parameter from the first building control device to the second building control device, storing the second building control parameter in the second memory of the second device, and providing one or more control signals from the second building control device for controlling one or more building components based at least in part on the second building control parameter that is stored in the second memory; and if the second building control parameter is designated as a local parameter, not transmitting the second building control parameter from the first building control device to the second building control device.

17. The method of claim 16, wherein the first building control parameter is designated as a global parameter and the second building control parameter is designated a local parameter.

18. The method of claim 17, wherein the first building control parameter and the second building control parameter are stored in the first memory.

19. The method of claim 15, wherein transmitting the first building control parameter from the first building control device to the second building control device is a wireless transmission.

20. The method of claim 15, wherein the plurality of building control devices comprises an HVAC system, and the user may change each parameter from local to global and/or from global to local.

* * * * *